United States Patent
Bilbao De Mendizabal

(10) Patent No.: US 11,635,310 B2
(45) Date of Patent: Apr. 25, 2023

(54) POSITION SENSOR SYSTEM AND METHOD, ROBUST AGAINST DISTURBANCE FIELD

(71) Applicant: Melexis Technologies SA, Bevaix (CH)

(72) Inventor: Javier Bilbao De Mendizabal, Zurich (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 19 days.

(21) Appl. No.: 17/371,996

(22) Filed: Jul. 9, 2021

(65) Prior Publication Data

US 2021/0333129 A1 Oct. 28, 2021

Related U.S. Application Data

(63) Continuation of application No. 16/453,321, filed on Jun. 26, 2019, now Pat. No. 11,143,527.

(30) Foreign Application Priority Data

Jun. 26, 2018 (EP) .................................... 18179892

(51) Int. Cl.
  *G01D 5/245* (2006.01)
(52) U.S. Cl.
  CPC ..................... *G01D 5/245* (2013.01)
(58) Field of Classification Search
  CPC .............. G01V 3/081; G05D 1/0265; G05D 2201/0216; G01D 5/245
  USPC .................... 324/207.11–207.26
  See application file for complete search history.

(56) References Cited

U.S. PATENT DOCUMENTS

| | | | | |
|---|---|---|---|---|
| 3,959,889 | A * | 6/1976 | Thomas ................. | G01R 33/02 33/355 R |
| 5,570,015 | A * | 10/1996 | Takaishi ................. | G01D 5/145 137/554 |
| 5,589,775 | A * | 12/1996 | Kuckes ............... | E21B 47/0228 175/45 |
| 5,670,877 | A * | 9/1997 | Scheiber ................ | G01D 3/036 324/207.16 |
| 6,366,085 | B1 * | 4/2002 | Yeshurun ............... | G01N 27/83 324/238 |

(Continued)

FOREIGN PATENT DOCUMENTS

| | | | | |
|---|---|---|---|---|
| DE | 102014116826 | A1 * | 5/2015 | ............. G01D 5/145 |
| DE | 102020105933 | A1 * | 9/2020 | ............. G01B 7/003 |

(Continued)

OTHER PUBLICATIONS

Extended European Search Report from EP Application No. 18179892.7, dated Dec. 18, 2018.

*Primary Examiner* — Jermele M Hollington
*Assistant Examiner* — Sean Curtis
(74) *Attorney, Agent, or Firm* — Workman Nydegger

(57) ABSTRACT

A position sensor system comprising: a magnetic field generator movable relative to two sensor devices or vice versa. The system has at least one processor adapted with a special algorithm for determining a position of the magnetic field generator in a manner which is highly robust against a disturbance field. A method for determining the position of the magnetic field generator based on a set of equations, in particular a set of linear equations which allows to completely eliminate the external disturbance field.

9 Claims, 19 Drawing Sheets

(56) References Cited

U.S. PATENT DOCUMENTS

| | | | | |
|---|---|---|---|---|
| 8,736,258 | B2* | 5/2014 | Trontelj | G01B 7/30 |
| | | | | 324/207.25 |
| 10,557,722 | B2* | 2/2020 | Roos | H02K 11/215 |
| 10,591,627 | B2* | 3/2020 | Frederick | G01V 3/081 |
| 10,704,925 | B2* | 7/2020 | Ausserlechner | G01D 3/028 |
| 2004/0017187 | A1* | 1/2004 | Van Ostrand | G01D 5/145 |
| | | | | 324/207.21 |
| 2010/0176804 | A1* | 7/2010 | Ausserlechner | G01D 3/028 |
| | | | | 324/207.25 |
| 2015/0137797 | A1* | 5/2015 | Ausserlechner | G01D 3/08 |
| | | | | 324/207.13 |
| 2015/0142376 | A1* | 5/2015 | Ausserlechner | G01D 5/145 |
| | | | | 702/151 |
| 2015/0346290 | A1* | 12/2015 | Holm | G01R 33/09 |
| | | | | 324/202 |
| 2017/0089706 | A1* | 3/2017 | Ribeiro | G06V 40/23 |
| 2017/0090568 | A1* | 3/2017 | Chen | G06F 3/014 |
| 2018/0087889 | A1* | 3/2018 | Ausserlechner | G01D 5/147 |
| 2018/0087926 | A1* | 3/2018 | Ausserlechner | G01D 5/165 |
| 2018/0128932 | A1* | 5/2018 | Frederick | G01V 3/081 |
| 2018/0164127 | A1* | 6/2018 | Anagawa | G01D 5/12 |
| 2019/0390983 | A1* | 12/2019 | Bilbao De Mendizabal | |
| | | | | G01D 5/145 |
| 2021/0333129 | A1* | 10/2021 | Bilbao De Mendizabal | |
| | | | | G01D 3/028 |
| 2022/0258039 | A1* | 8/2022 | Bonneau | G06F 3/0338 |

FOREIGN PATENT DOCUMENTS

| | | | | |
|---|---|---|---|---|
| EP | 3588011 A1 * | 1/2020 | | G01B 7/003 |
| KR | 20180054469 A * | 5/2018 | | |
| WO | 2014029885 A1 | 2/2014 | | |
| WO | WO-2021170169 A1 * | 9/2021 | | |

* cited by examiner

SensorA:
$V1x = B1magx + Bextx$      [41]
$V1y = B1magy + Bexty$      [42]

SensorB:
$V2x = B2magx + Bextx$      [43]
$V2y = B2magy + Bexty$      [44]

v1x, v1y, v2x, v2y are measured
=> 4 equations, 6 unknows (B1magx, B1magy, B2magx, B2magy, Bextx, Bexty)

Case 1:
SensorA and SensorB in parallel planes, and 3 axes are aligned, magnitude of field at location of sensorA and sensorB equally strong, magnetic field oriented anti-parallel $$\begin{cases} B2magx = -B1magx & [51] \\ B2magy = -B1magy & [52] \end{cases}$$

$$\begin{cases} \text{SensorA:} \\ \quad V1x = B1magx + Bextx & [53] \\ \quad V1y = B1magy + Bexty & [54] \\ \text{SensorB:} \\ \quad V2x = -B1magx + Bextx & [55] \\ \quad V2y = -B1magy + Bexty & [56] \end{cases}$$

4 equations, 4 unknowns: unique solution

[53]-[55] : $V1x - V2x = 2 \cdot B1magx$
Thus: $B1magx = (V1x - V2x)/2$     [57]

[54]-[56] : $V1y - V2y = 2 \cdot B1magy$
Thus: $B1magy = (V1y - V2y)/2$     [58]

e.g. IF: $B1magx \sim \cos(\alpha)$
$B1magy \sim \sin(\alpha)$

Then: $tg(\alpha) = B1magy / B1magx$
And: $\alpha = \arctan(B1magy / B1magx)$     [59]

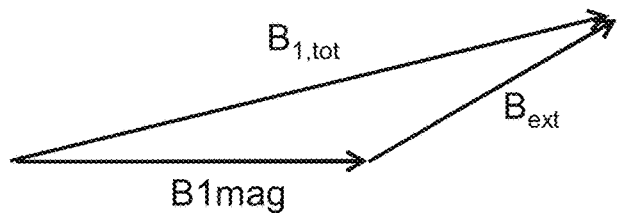
FIG 6(a)
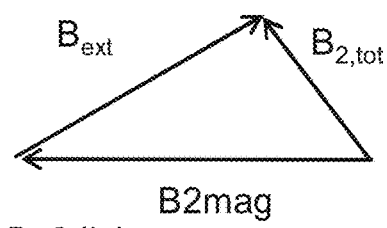
FIG 6(b)
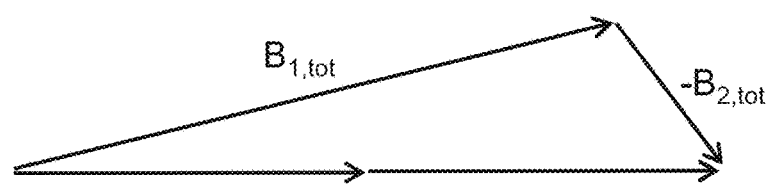
FIG 6(c)
FIG 7(a)
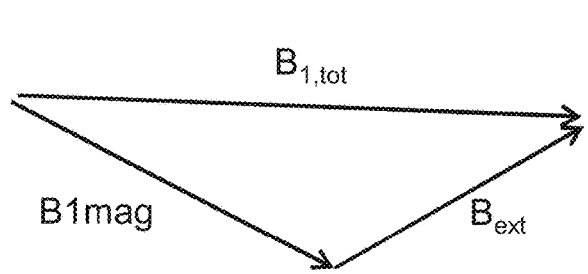
FIG 7(b)
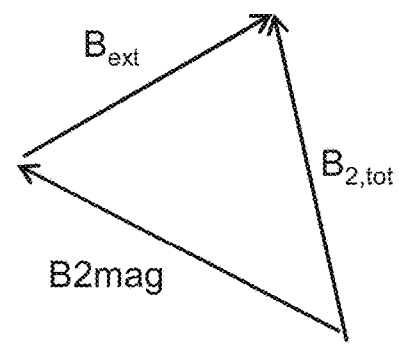
FIG 7(c)
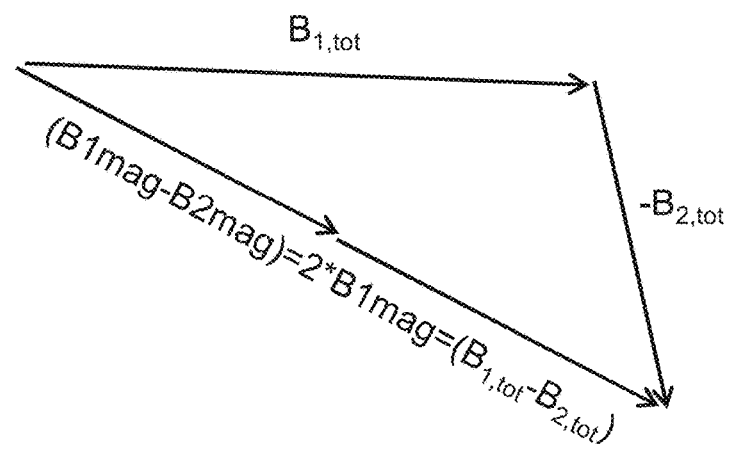

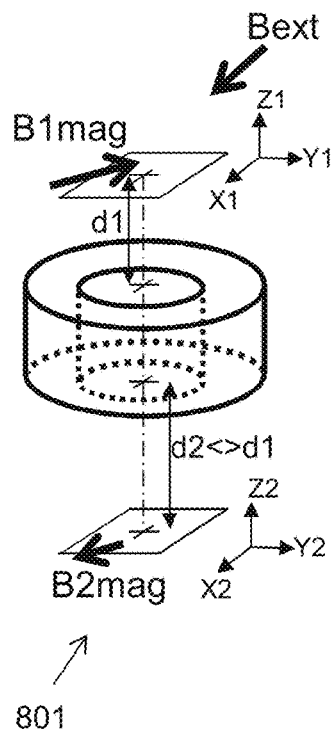 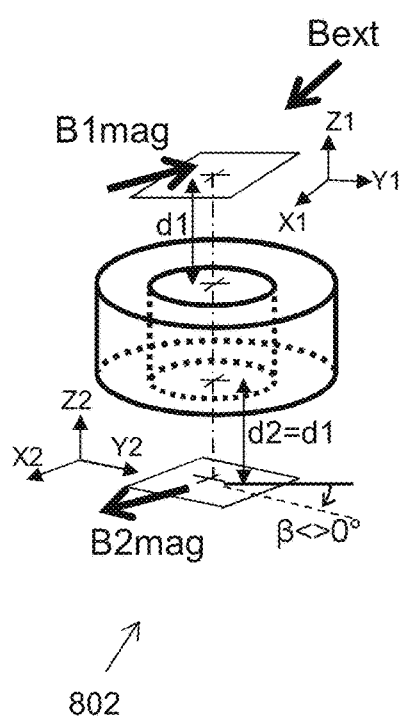 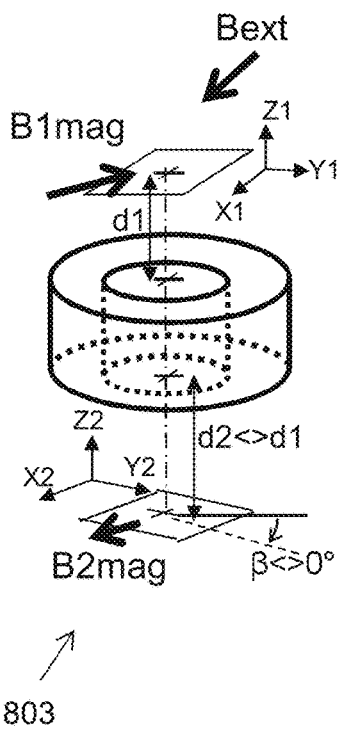
FIG. 8(a)  FIG. 8(b)  FIG. 8(c)
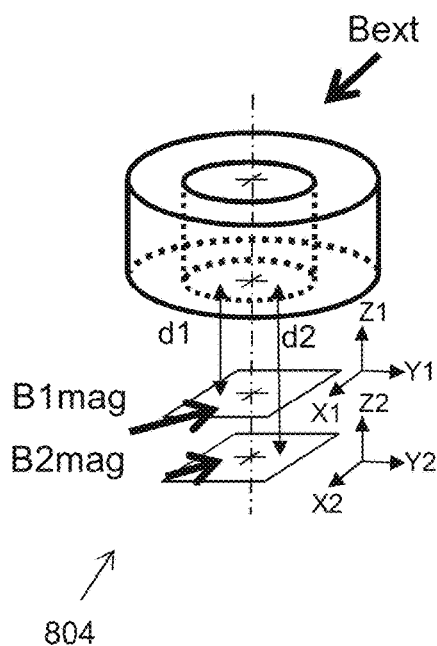 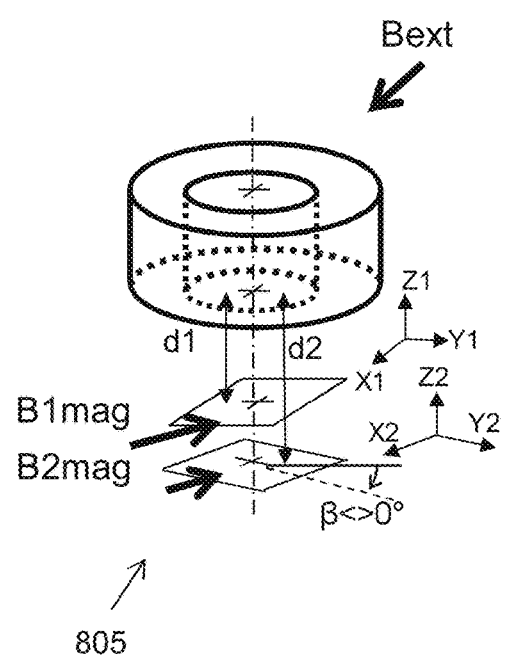
FIG. 8(d)  FIG. 8(e)

Case 2:

SensorA and SensorB in parallel planes,
first and second coordinate system aligned (X1//X2, Y1//Y2, Z1//Z2),
magnetic field anti-parallel (180°)

$$\begin{cases} B2magx = k.B1magx & [91] \\ B2magy = k.B1magy & [92] \end{cases}$$

$$\begin{cases} \text{SensorA:} \\ \quad V1x = B1magx + Bextx & [93] \\ \quad V1y = B1magy + Bexty & [94] \\ \\ \text{SensorB:} \\ \quad V2x = k.B1magx + Bextx & [95] \\ \quad V2y = k.B1magy + Bexty & [96] \end{cases}$$

k is known, (e.g. from calibration)

=> (93) to (96) is set of 4 equations with 4 unknows,
=> B1magx, B1magy, Bextx, Bexty has unique solution

(93)-(95):  V1x-V2x=(1-k).B1magx
Thus:       B1magx=(V1x-V2x)/(1-k)     [97]

(94)-(96):  V1y-V2y=(1-k).B1magy
Thus:       B1magy=(V1y-V2y)/(1-k)     [98]

e.g. IF:    B1magx ~ cos(α)
            B1magy ~ sin(α)

Then:       tg(α)=B1magy/B1magx
And:        α=arctan(B1magy/B1magx)    [99]

Case 3:
SensorA and SensorB in parallel planes but rotated, Z1//Z2, but X2,Y2 rotated over angle β with respect to X1,Y1, magnetic field anti-parallel (180°)

$$\begin{cases} B2magx = m \cdot B1magx + n \cdot B1magy + p & [101] \\ B2magy = q \cdot B1magx + r \cdot B1magy + s & [102] \end{cases}$$

$$\begin{cases} \text{SensorA:} \\ \quad V1x = B1magx + Bextx & [103] \\ \quad V1y = B1magy + Bexty & [104] \\ \text{SensorB:} \\ \quad V2x = m \cdot (B1magx + Bextx) + n \cdot (B1magy + Bexty) + p & [105] \\ \quad V2y = q \cdot (B1magx + Bextx) + r \cdot (B1magy + Bexty) + s & [106] \end{cases}$$

m, n, p, q, r, s are known (e.g. from calibration)

=> [103] to [106] is set of 4 equations with 4 unknowns,
=> B1magx, B1magy, Bextx, Bexty has unique solution e.g. IF:  $B1magx \sim \cos(\alpha)$
         $B1magy \sim \sin(\alpha)$

Then:  $tg(\alpha) = B1magy/B1magx$
And:   $\alpha = \arctan(B1magy/B1magx)$  [109]

1000

FIG 10

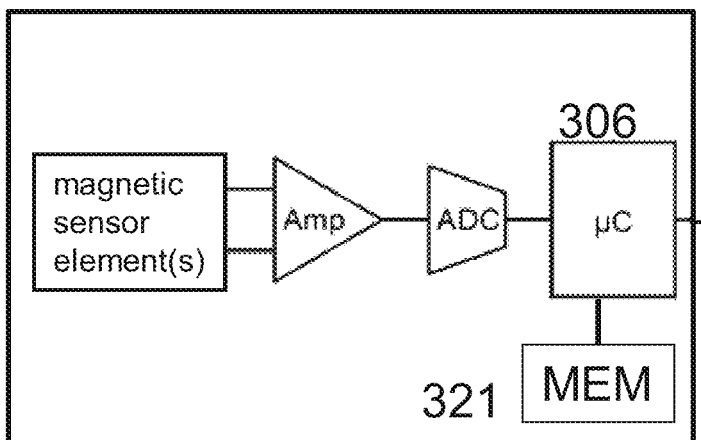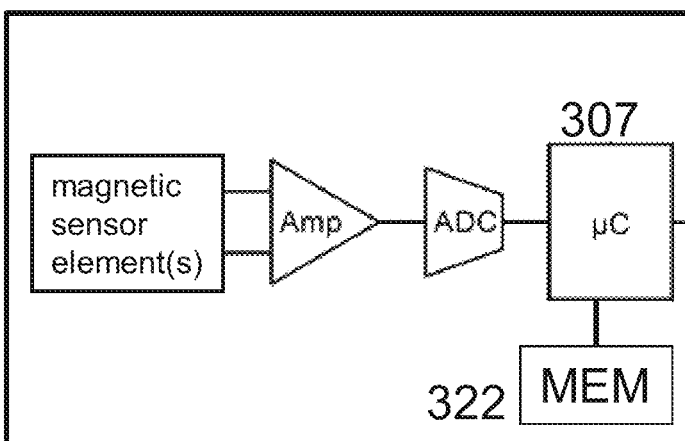
FIG 11

Case 4A: (first formulation)
- SensorA and SensorB can measure in 3 dimensions,
- SensorA and SensorB located at any relative position (dx,dy,dz), and any known orientation (roll, yaw, pitch)

$$\begin{cases} B2magx = f1(B1magx, B1magy, B1magz) & [1301] \\ B2magy = f2(B1magx, B1magy, B1magz) & [1302] \\ B2magz = f3(B1magx, B1magy, B1magz) & [1303] \end{cases}$$

for a given fixed position and orientation and magnet

"Bext" measured by sensorB is the same field as that measured by sensorA, but expressed in shifted+rotated coordinate system $$\begin{cases} Bextx2 = a \cdot Bextx1 + b \cdot Bexty1 + c \cdot Bextz1 & [1304] \\ Bexty2 = d \cdot Bextx1 + e \cdot Bexty1 + f \cdot Bextz1 & [1305] \\ Bextz2 = g \cdot Bextx1 + h \cdot Bexty1 + i \cdot Bextz1 & [1306] \end{cases}$$

SensorA:
$\quad$ V1x = B1magx + Bextx1 $\quad$ [1307]
$\quad$ V1y = B1magy + Bexty1 $\quad$ [1308]
$\quad$ V1z = B1magz + Bextz1 $\quad$ [1309]

SensorB:
$\quad$ V2x = B2magx + Bextx2
$\quad\quad$ = f1(B1magx, B1magy, B1magz)
$\quad\quad$ + a·Bextx1 + b·Bexty1 + c·Bextz1 $\quad$ [1310]
$\quad$ V2y = B2magy + Bexty2
$\quad\quad$ = f2(B1magx, B1magy, B1magz)
$\quad\quad$ + d·Bextx1 + e·Bexty1 + f·Bextz1 $\quad$ [1311]
$\quad$ V2z = B2magz + Bextz2
$\quad\quad$ = f3(B1magx, B1magy, B1magz)
$\quad\quad$ + g·Bextx1 + h·Bexty1 + i·Bextz1 $\quad$ [1312]

f1..f3, a..i are known for given magnet+sensor positions & orientations
V1x, V1y, V1z, V2x, V2y, V2z are measured => [1307] to [1312] is set of 6 equations with 6 unknows, which has a unique solution
=> B1magx, B1magy, B1magz can be determined
=> angular position α can be determined

FIG 13

Case 4B: (second formulation)
- SensorA and SensorB can measure in 3 dimensions,
- SensorA and SensorB located at any relative position (dx,dy,dz),
   and any known orientation (roll, yaw, pitch)

$$\begin{cases} B1magx = g1(\alpha) & [1401] \\ B1magy = g2(\alpha) & [1402] \\ B1magz = g3(\alpha) & [1403] \\ B2magx = g4(\alpha) & [1404] \\ B2magy = g5(\alpha) & [1405] \\ B2magz = g6(\alpha) & [1406] \end{cases}$$

g1 to g6 are known, e.g. by design or by calibration $$\begin{cases} \text{SensorA:} \\ \quad V1x = B1magx + Bextx1 = g1(\alpha) + Bextx1 & [1407] \\ \quad V1y = B1magy + Bexty1 = g2(\alpha) + Bexty1 & [1408] \\ \quad V1z = B1magz + Bextz1 = g3(\alpha) + Bextz1 & [1409] \\ \text{SensorB:} \\ \quad V2x = B2magx + Bextx2 \\ \quad \quad = g4(\alpha) + (a.Bextx1 + b.Bexty1 + c.Bextz1) & [1410] \\ \quad V2y = B2magx + Bexty2 \\ \quad \quad = g5(\alpha) + (d.Bextx1 + e.Bexty1 + f.Bextz1) & [1411] \\ \quad V2z = B2magz + Bextz2 \\ \quad \quad = g6(\alpha) + (g.Bextx1 + h.Bexty1 + i.Bextz1) & [1412] \end{cases}$$

a..i are known, e.g. by design or by calibration,
V1x, V1y, V1z, V2x, V2y, V2z are measured => [1407] to [1412] is set of 6 equations with 4 unknows
   ($\alpha$, Bextx1, Bexty1, Bextz1)
=> this is an overspecified set of equations,
   which has a unique solution
=> find best matching values (e.g. by iterative process)

Special case (case 5):
- different positions of the sensors,
- orthogonal orientation of the sensors Relation between sensor coordinate systems (for Bext):
(not taking into account offset, which is irrelevant for Bext)
Z2=-Y1
Y2=Z1
X2=X1

Case 5:
- SensorA and SensorB can measure in 3 dimensions,
- different field at SensorA and sensorB position,
- SensorA and SensorB oriented orthogonal (X2=X1, Y2=Z1, Z2=-Y1)

$$\begin{cases} B1magx = g1(\alpha) & [1601] \\ B1magy = g2(\alpha) & [1602] \\ B1magz = g3(\alpha) & [1603] \\ B2magx = g4(\alpha) & [1604] \\ B2magy = g5(\alpha) & [1605] \\ B2magz = g6(\alpha) & [1606] \end{cases}$$

g1 to g6 are known for a given fixed position and orientation of the sensors relative to the magnet, and for a particular magnet.

$$\begin{cases} \text{SensorA:} \\ \quad V1x = B1magx + Bextx1 = g1(\alpha) + Bextx1 \quad [1607] \\ \quad V1y = B1magy + Bexty1 = g2(\alpha) + Bexty1 \quad [1608] \\ \quad V1z = B1magz + Bextz1 = g3(\alpha) + Bextz1 \quad [1609] \\ \text{SensorB:} \\ \quad V2x = B2magx + Bextx2 = g4(\alpha) + Bextx1 \quad [1610] \\ \quad V2y = B2magy + Bexty2 = g5(\alpha) + Bextz1 \quad [1611] \\ \quad V2z = B2magz + Bextz2 = g6(\alpha) - Bexty1 \quad [1612] \end{cases}$$

V1x, V1y, V1z, V2x, V2y, V2z are measured $$\begin{cases} [1607]-[1610]: & V1x-V2x = g1(\alpha)-g4(\alpha) & [1613] \\ [1608]+[1612]: & V1y+V2z = g2(\alpha)+g6(\alpha) & [1614] \\ [1609]-[1611]: & V1z-V2y = g3(\alpha)-g5(\alpha) & [1615] \end{cases}$$

=> set of 3 equations in 1 variable ($\alpha$),
=> this is an overspecified set of equations,
    which has a unique solution
=> find best matching value for $\alpha$ (e.g. in an iterative way)

Special case (case 6):
- different positions of the sensors,
- parallel orientation of the sensors, and coordinate systems aligned Relation between sensor coordinate systems (for Bext):
(not taking into account offset, which is irrelevant for Bext)
Z2=Z1
Y2=Y1
X2=X1

Case 6:
- SensorA and SensorB can measure in 3 dimensions,
- different field at SensorA and sensorB position,
- SensorA and SensorB parallel and aligned (X2=X1, Y2=Y1, Z2=Z1)

$$\begin{cases} B1magx = g1(\alpha) & [1801] \\ B1magy = g2(\alpha) & [1802] \\ B1magz = g3(\alpha) & [1803] \\ B2magx = g4(\alpha) & [1804] \\ B2magy = g5(\alpha) & [1805] \\ B2magz = g6(\alpha) & [1806] \end{cases}$$

g1 to g6 are known for a given fixed position and orientation of the sensors relative to the magnet, and for a particular magnet.

$$\begin{cases} \text{SensorA:} & \\ \quad V1x=B1magx+Bextx1 = g1(\alpha)+Bextx1 & [1807] \\ \quad V1y=B1magy+Bexty1 = g2(\alpha)+Bexty1 & [1808] \\ \quad V1z=B1magz+Bextz1 = g3(\alpha)+Bextz1 & [1809] \\ \text{SensorB:} & \\ \quad V2x=B2magx+Bextx2 = g4(\alpha)+Bextx1 & [1810] \\ \quad V2y=B2magy+Bexty2 = g5(\alpha)+Bexty1 & [1811] \\ \quad V2z=B2magz+Bextz2 = g6(\alpha)+Bextz1 & [1812] \end{cases}$$

V1x, V1y, V1z, V2x, V2y, V2z are measured $$\begin{cases} [1807]\text{-}[1810]: & V1x\text{-}V2x=g1(\alpha)\text{-}g4(\alpha) & [1813] \\ [1808]\text{-}[1811]: & V1y\text{-}V2z=g2(\alpha)\text{-}g5(\alpha) & [1814] \\ [1809]\text{-}[1812]: & V1z\text{-}V2z=g3(\alpha)\text{-}g6(\alpha) & [1815] \end{cases}$$

=> set of 3 equations in 1 variable ($\alpha$),
=> this is an overspecified set of equations,
   which has a unique solution
=> find best matching value for $\alpha$ (e.g. in an iterative way)

POSITION SENSOR SYSTEM AND METHOD, ROBUST AGAINST DISTURBANCE FIELD

FIELD OF THE INVENTION

The present invention relates in general to the field of position sensor systems using a magnetic field generator, and more in particular to a linear or an angular position system comprising two (e.g. only two) sensor devices, the system being adapted for determining a linear or an angular position that is substantially insensitive to an external disturbance field, irrespective of its orientation and even if this disturbance field has a magnitude in the same order of magnitude as that of the magnetic field generator (e.g. permanent magnet). The present invention also relates to a method of determining said linear or angular position in a processor.

BACKGROUND OF THE INVENTION

Magnetic sensor systems, in particular linear or angular position systems are known in the art. They offer the advantage of being able to measure an angular position without making physical contact.

It is a challenge to build a sensor system that is substantially insensitive to a constant external magnetic disturbance field (also known as "fremdfeld"). This problem is known in the art, and is addressed in different ways.

WO2014/029885A1 describes sensor arrangements for measuring an angular position using a multi-pole magnet. Some embodiments described therein address the problem of robustness against an external disturbance field by using a multi-pole magnet and by determining the angular position by measuring magnetic field gradients rather than magnetic field values per se.

US2018087926A1 discloses a sensor system (duplicated in FIG. 1, which is a replica of FIG. 1 of US'926) comprising a permanent magnet and two angle sensor devices, one adapted for providing a first angle φ1, the other for providing a second angle φ2 respectively, as shown in FIG. 2 which is a replica of FIGS. 19(a) and 19(b) of US'926. Both individual angles φ1, φ2 are incorrect in the presence of an external disturbance field Bd. If the disturbance field is small (e.g. more than 10 times smaller than the field of the magnet), and if the external field is oriented substantially perpendicular to the field of the magnet, the error due to the external disturbance field can be reduced based on a combination of the angles φ1 and φ2, but not completely eliminated.

US2018/164127 discloses an angle sensor with a plurality of at least four sensors, each providing an angle which is disturbed by an external disturbance field, and a processor for determining an overall angular position using least mean squares for reducing the errors.

There is always room for improvements or alternatives.

SUMMARY OF THE INVENTION

It is an object of embodiments of the present invention to provide a position system capable of determining a position of a magnetic field generator (e.g. a permanent magnet), in a manner that is highly insensitive to a disturbance field, in particular a constant disturbance field.

It is an object of particular embodiments of the present invention to provide a linear or an angular position system capable of determining a linear or an angular position of a magnetic field generator (e.g. a permanent magnet), in a manner that is capable of providing an accurate position, even if this disturbance field has a magnitude larger than 20% or larger than 40% or larger than 50% of the magnitude as that of the magnetic field generated by the magnetic field generator (e.g. permanent magnet).

It is a object of particular embodiments of the present invention to provide such a position system comprising sensor devices which, when considered alone, are not robust against an external disturbance field.

It is a object of particular embodiments of the present invention to provide such a linear or angular position system comprising only two sensor devices which, when considered alone, are not robust against an external disturbance field, but the system being substantially insensitive to a disturbance field, even if the disturbance field has a magnitude larger than 20% of the magnetic field generated by the magnetic field generator (e.g. permanent magnet). The two sensor devices may be two discrete integrated circuits (ICs).

It is also an object of embodiments of the present invention to provide a method for determining a linear or angular position of the magnetic field generator (e.g. permanent magnet).

It is an object of particular embodiments of the present invention to provide a system wherein the magnetic field generator and the sensor devices are arranged in a particular manner (position and/or orientation) such that the complexity of the algorithm for determining the linear or angular position is reduced, without compromising the robustness against the external disturbance field (if present).

It is an object of particular embodiments of the present invention to provide a linear or angular position system where the mounting requirements of the sensor devices and the magnetic field generator are drastically reduced, without compromising the robustness against the external disturbance field (if present).

These objectives are accomplished by a position system and by a method for determining a position according to embodiments of the present invention.

According to a first aspect, the present invention provides a position sensor system comprising: a magnetic field generator movable relative to a first and a second sensor device or vice versa, and being adapted for providing a first magnetic field vector to the first magnetic sensor device and for providing a second magnetic field vector different from the first magnetic field vector, to the second magnetic sensor device; the first sensor device being adapted for determining first vector data (e.g. v1x, v1y; or v1x, v1z) related to a combination of said first magnetic field vector and an external disturbance field, if present; the second sensor device being adapted for determining second vector data (e.g. v2x, v2y; or v2x, v2z) related to a combination of said second magnetic field vector and said external disturbance field, if present; the position sensor system further comprising at least one processor adapted for receiving the first vector data and the second vector data, and adapted for performing a method of determining a position of the magnetic field generator relative to the first and second sensor, which is based on the first vector data and the second vector data in a manner which eliminates the external disturbance field.

The disturbance field may be zero.

With "eliminates the external disturbance field, even if its magnitude is in the same order of magnitude as the magnetic source" is meant for example: "without assuming that the external disturbance field has a particular orientation" and without assuming that the magnitude of the external disturbance field is smaller than 10% of the field created by the magnetic source."

The vector data may be 2D-vector data or 3D-vector data.

With the "first magnetic field vector being different from the second magnetic field vector" is meant two different vectors when expressed in absolute coordinates.

The first sensor device and the second sensor device are preferably located in different positions.

The first sensor device can determine the first vector data with reference to a first local coordinate system, for example having axes X1, Y1 or X1, Y1, Z1, and the second sensor device can determine the second vector data with reference to a second local coordinate system, for example having axes X2, Y2 or X2, Y2, Z2. These coordinate systems may be fully aligned (i.e. the 3 corresponding axes are parallel), or not aligned (i.e. none of the 3 corresponding axes are parallel), or partly aligned (e.g. X1 and X2 are aligned, but Y1 and Y2 are not, and Z1 and Z2 are not).

In preferred embodiments, these axes correspond to directions of maximum sensitivity of sensors (e.g. sensor circuits or sensor elements) used in the first and second devices. For example the Z-axis could typically correspond to a direction perpendicular to the semiconductor plane, and the Z-component can e.g. be measured by a so called "horizontal Hall element". The X-axis and the Y-axis are typically two axes parallel to the semiconductor plane, and perpendicular to each other. The X-component and Y-component can for example be measured using two vertical Hall elements, but other sensor elements or sensor structures may also be used.

It is a major advantage of this angular position system that the influence of an external magnetic field can be reduced, e.g. substantially eliminated, by combining the vector information obtained from said two sensor devices.

It is an advantage of this algorithm that it does not have to rely on the magnitude of the external field being negligibly small, for example having a magnitude smaller than 10% of the magnitude of the magnetic field provided by the magnetic field generator (e.g. permanent magnet).

It is an advantage of this algorithm that it still provides the correct angular value, even if the magnitude of the external disturbance field is larger than 20% or even larger than 40% of the magnitude of the magnetic field provided by the magnetic field generator.

The processor can be a processor inside one of the sensor devices, or inside both of the sensor devices, or an external processor, or combinations thereof. Of course, the sensor devices would be interconnected and/or connected to said external processor for providing said vector data. This communicative connection may be a wired connection or a wireless connection.

The position sensor system can be a linear position sensor system or an angular position sensor system. The angular position system can be used for example for determining an angular position of a rotor (comprising the magnetic field source) with respect to a stator (comprising the two sensor devices), and is particularly useful in an automotive environment.

In an embodiment, the first sensor device is adapted for measuring the first combined magnetic field vector in only two dimensions or in three dimensions, and for providing two or only two values or three values corresponding to said two-dimensional or three-dimensional vector data; and the second sensor device is adapted for measuring and providing the second combined magnetic field vector in only two dimensions or in three dimensions, and for providing two or only two values or three values corresponding to said two-dimensional or three-dimensional vector data; and said method is based on solving a set of equations using two or only two or three values measured from each sensor.

An algorithm that uses at least two values from each sensor is clearly different from an algorithm that uses only a single value from each sensor, such as e.g. an angle value.

The set of equations may be a set of linear equations. An algorithm bases on first solving a set of linear equations to completely eliminate the external magnetic field components, and then finding the angular position based on the remaining equations where the external field does not play a role, is clearly different from a set of equations which assumes that the external field has a small amplitude, the influence of which can be reduced by taking multiple measurements in several directions, e.g. using least-mean-squares approximation.

In an embodiment, the position sensor system is a linear position sensor system; and the position is a linear position; and the magnetic field generator is movable along a longitudinal axis, or the first and second sensor are movable along a longitudinal axis; and the first and second magnetic sensor device have a predefined first and second position and a predefined first and second orientation relative to said longitudinal axis.

In an embodiment, the position sensor system is an angular position sensor system; and the position is an angular position; and the magnetic field generator is rotatable about a longitudinal axis; and the first and second magnetic sensor device have a predefined first and second position and a predefined first and second orientation relative to said longitudinal axis.

In an embodiment, both the first sensor device and the second sensor device are substantially located on the axis of the magnetic field source.

With "substantially located on the axis" is meant for example that a radial offset from the axis is less than 1.0 mm, preferably less than 0.7 mm, or less than 0.5 mm.

In an embodiment, the first sensor device is substantially located on the axis of the magnetic field source; and the second sensor device is located at a distance of at least 1.0 mm from the axis, for example a distance larger than 1.5 mm, or larger than 2.0 mm, or larger than 2.5 mm, or larger than 3.0 mm, or larger than 4.0 mm or larger than 5.0 mm. Or stated in other words, in this embodiment, the first sensor device is located "on-axis", while the second sensor device is located "off-axis". It is an advantage of this embodiment that the first and second magnetic field vectors are typically quite different for all angular positions, and that the physical placement of these sensor devices may be easier.

In an embodiment, both the first sensor device and the second sensor device are located at a distance of at least 1.0 mm from the axis, for example a distance larger than 1.5 mm, or larger than 2.0 mm, or larger than 2.5 mm, or larger than 3.0 mm, or larger than 4.0 mm or larger than 5.0 mm. Or stated in other words, in this embodiment, the first and the second sensor device are both located "off-axis".

In an embodiment, the first sensor device comprises a first substrate defining a first plane; and the second sensor device comprises a second substrate defining a second plane; and the first and second sensor device are oriented such that the first plane and the second plane are substantially perpendicular.

It is an advantage of this embodiment that the perpendicular arrangement can simplify the set of equations.

In an embodiment, the first sensor device has at least two magnetic sensors defining at least two different directions of maximum sensitivity (e.g. X1,Y1; X1,Z1; X1,Y1,Z1) corresponding to a first local coordinate system; and the second sensor device has at least two magnetic sensors defining at least two different directions of maximum sensitivity (e.g. X2,Y2; X2,Z2; X2,Y2,Z2) corresponding to a second local coordinate system; and none of the axes of the first coordinate system is parallel to any of the axes of the second coordinate system.

It is an advantage of this embodiment that the first and second sensor can be oriented in any direction, making the mechanical design easier. Yet, by solving the set of equations, the angular position can be uniquely determined. In particular embodiments, the positions of the first and second sensor can be specifically chosen to simplify the set of equations.

In an embodiment, at least one or at least two or all three components of the first magnetic field vector and the second magnetic field vector provided by the magnetic field source are different for all angular positions of the magnetic field source.

It is an advantage that at least one component, but preferably at least two components or at least three components are different, because this not only ensures that the set of equations only has a single solution, but moreover may provide an over-specified set of equations, which may help to improve accuracy due to for example rounding errors.

In preferred embodiments, their amplitude is different by at least 5%, or their orientations are different by at least 5° or at least 10° or at least 20° or at least 30°, or both.

With "the first vector and the second vector are different" is meant that their magnitude is different or their orientation is different, or both.

In preferred embodiments, their amplitude is different by at least 5%, or their orientations are different by at least 5° or at least 10° or at least 20° or at least 30°, or both.

In an embodiment, the first sensor device comprises a first substrate defining a first plane; and the second sensor device comprises a second substrate defining a second plane; and the first plane and the second plane are substantially parallel.

It is an advantage of this embodiments, that the external disturbance field components measured by the first and second sensor are identical, except for an in-plane rotation, which can be mathematically described as a two-dimensional matrix-calculation with fixed coordinates, depending on the alignment of the axis of the two sensor devices, which are fixed over time, and can be determined by calibration.

In an embodiment, the first plane and the second plane coincide.

It is an advantage of this embodiment that the two sensor devices may for example be mounted on a single PCB.

In an embodiment, the first sensor device and the second sensor device are located substantially on said axis.

In an embodiment, the magnetic field source is adapted to provide the first magnetic field vector to the first sensor device and the second magnetic field vector to the second sensor device in a manner such that a first projection of the first magnetic field vector in the first plane is parallel or anti-parallel to a second projection of the second magnetic field vector in the second plane.

It is an advantage of this embodiment that the first plane and second plane are parallel, because then the influence of a constant external disturbance field oriented in any direction X,Y,Z, is exactly the same in both planes.

It is an advantage that the magnet provides a first magnetic field vector to the first sensor device, and a second magnetic field vector to the second sensor device, which first and second magnetic field vector is either parallel (i.e. define an angle of about 0°) or anti-parallel (i.e. define an angle of about 180°), because this allows geometrical symmetry considerations to be used to simplify the calculations, in a manner which allows to fully eliminate the influence of the external field by simple vector addition or subtraction.

In an embodiment, the first projection of the first magnetic field vector B1mag in the first plane is anti-parallel to the second projection of the second magnetic field vector B2mag in the second plane; and the method comprises calculating the position based on the following set of formulas or an equivalent set of formulas:

$$\begin{cases} B1magx = (v1x - v2x)/2; \\ B1magy = (v1y - v2y)/2 \end{cases}$$

where (v1x, v1y) are vector coordinates of the first total vector v1 measured by the first sensor device, and (v2x, v2y) are vector coordinates of the second total vector v2 measured by the second sensor device, and (B1magx, B1magy) are vector-coordinates of the first projection of the field created solely by the magnetic generator.

The first and second sensor device may be located on said axis.

It is an advantage of this embodiment, that the angular position can be calculated using simple subtraction of vectors, and that no value needs to be determined during calibration, but the mounting requirements of the sensor devices are somewhat more stringent.

In an embodiment, the magnetic field generator (e.g. the permanent magnet) is located between the two planes.

In an embodiment, the first plane and the second plane are a single plane, and the sensor devices are located on the same side as the magnet, adjacent each other.

In an embodiment, the system is adapted for calculating the angular position according to the following formula: $\alpha = \arctan(B1magy/B1magx)$.

It is an advantage of this embodiment, that the angular position can be calculated using a single goniometrical function, which can be implemented for example using a look-up table, which is optionally interpolated. It is noted however that a perfect arctangent function is not required, and the look-up table may compensate for higher harmonics, for example.

In an embodiment, the first sensor device is configured for measuring an in-plane field component (e.g. B1x in a direction parallel to the semiconductor plane of the first sensor device) and an out-of-plane field component (e.g. B1z in a direction perpendicular to the semiconductor plane) at the first sensor position, and the second sensor device is configured for measuring an in-plane field component (e.g. B2x in a direction parallel to the semiconductor plane of the second sensor device) and an out-of-plane field component (e.g. B2z in a direction perpendicular to the semiconductor plane) at the second location; and the magnetic source is magnetized such that, and the first sensor device is oriented relative to the magnetic field source such that the first in-plane field component (e.g. B1x) is substantially 90° phase shifted relative to the first out-of-plane field component (e.g. B1z), (or stated in other words: such that a waveform of the first in-plane field component as a function of the position is 90° phase shifted with respect to a waveform of the first out-of-plane field component as a function of the position); and wherein the magnetic source is magnetized such that, and the second sensor device is oriented relative to the magnetic field source such that the second in-plane field component (e.g. B2x) is substantially 90° phase shifted relative to the second out-of-plane field component (e.g. B2z); and wherein the first and the second sensor device are spaced apart such that the first in-plane magnetic field component (e.g. B1x) is phase shifted relative to the second in-plane magnetic field component (e.g. B2x) by a value in the range from 30° to 330°, or a value in the range from 60° to 300°, or a value in the range from 90° to 270°, or a value in the range from 120° to 240°, or a value in the range from 150° to 210°, e.g. equal to about 180°.

In this embodiment, (illustrated for example in FIGS. 19(a) and 19(b), FIGS. 20(a) and 20(b) and FIG. 21), the position and orientation of the sensor devices with respect to the magnetic source is specifically chosen, such that the at least four signals measured by the sensor devices are 90° and 180° phase shifted with respect to each other. This allows the angular position to be determined in a manner which is completely insensitive to an external disturbance field, and moreover, using a relatively simple set of formulas.

The first and second sensor device may be located off-axis (e.g. at a distance of at least 1.0 mm from the axis).

In an embodiment, the method is adapted for calculating the angular position based on the following set of formulas:

$$\begin{cases} B1magx = (v1x - v2x)/2; \\ B1magz = (v1z - v2z)/2 \end{cases}$$

where (v1x, v1z) are vector coordinates of the first vector v1 measured by the first sensor device, and (v2x, v2z) are vector coordinates of the second vector v2 measured by the second sensor device, and (B1magx, B1magz) are vector-coordinates of the magnetic field created solely by the magnetic generator.

It is an advantage of this embodiment, that it involves mere subtraction of values obtained measured by the sensors. It should be appreciated that the value v1x itself may vary with an external disturbance field, but the difference signal (v1x−v2x) does not, and due to the specific placement of the two sensor devices.

The inventors surprisingly found that this particular arrangement of the sensors devices leads to leads to extremely simple formulas. As far as is known to the inventors, this particular arrangement is not known in the art.

In an embodiment, the system is adapted for calculating the angular position α based on the following formula: α=arctan(B1magz/B1magx).

In practice, the processor performing this method may calculate an arctangent function, or may obtain this value using a look-up table, or in any other suitable way.

In an embodiment, the angular position system comprises only two sensor devices including said first sensor device and said second sensor device.

It is a major advantage of such embodiment that only two sensor devices are required (in contrast for example to systems where at least four sensor devices are used, and where the influence caused by the external disturbance field is not completely eliminated by design, by merely reduced, e.g. using least mean squares).

According to a second aspect, the present invention also provides a computer-implemented method for determining a position of the magnetic field generator of a position sensor system according to the first aspect, in a processor; the method comprising the following steps:

a) receiving first vector data from a first sensor device, the first vector data being two-dimensional data (e.g. two in-plane field components, or one in-plane component and one out-of-plane component) or three-dimensional data related to a combination of said first magnetic field vector and an external disturbance field, if such disturbance field is present;

b) receiving second vector data from a second sensor device, the second vector data being two-dimensional data (e.g. two in-plane field components, or one in-plane component and one out-of-plane component) or three-dimensional data related to a combination of said second magnetic field vector and said external disturbance field, if present;

c) determining a position of the magnetic field generator based on the first vector data and the second vector data in a manner which eliminates the external disturbance field, even if a magnitude of the external disturbance field is in the same order as the field generated by the magnetic field generator.

This method can be executed by a processor embedded inside one or both sensor devices, or by an external processor, connected to these sensor devices.

In an embodiment, the first sensor device is adapted for measuring two in-plane field component values (e.g. v1x, v1y), or for measuring one in-plane field component value and one out-of-plane field component value (e.g. v1x, v1z), or for measuring three values (e.g. v1x, v1y, v1z) corresponding to said two-dimensional or three-dimensional vector data; and the second sensor device is adapted for measuring two in-plane field component values (e.g. v2x, v2y), or for measuring one in-plane field component value and one out-of-plane field component value (e.g. v2x, v2z), or for measuring three values (e.g. v2x, v2y, v2z) corresponding to said two-dimensional or three-dimensional vector data; and said algorithm is based on solving a set of equations using at least two values from each sensor device.

In preferred embodiments, the set of equations is a set of linear equations, meaning a set of first order polynomial equations of a plurality of variables including variables for the external disturbance field (Bext), e.g. a plurality of variables representing magnetic field strength of a magnetic field created by the magnetic field source (e.g. permanent magnet), and magnetic field strength of the unknown external disturbance field.

In preferred embodiment, the set of linear equations contains (or is reduced to) only two linear equations.

In an embodiment, the first sensor device is adapted for measuring the first combined magnetic field vector and for providing two values or three values corresponding to said two-dimensional or three-dimensional vector data; and the second sensor device is adapted for measuring and providing the second combined magnetic field vector and for providing two values or three values corresponding to said two-dimensional or three-dimensional vector data; and said algorithm is based on solving a set of equations using at least two values from each sensor device.

With "combined magnetic field" or "total magnetic field" is meant: the combination (or superposition) of the magnetic field generated by the magnetic source, e.g. permanent magnet and the external disturbance field.

In preferred embodiments, the method may be adapted for determining the angular position for a specific arrangement (position and/or orientation) of the two sensor devices, as described above.

Particular and preferred aspects of the invention are set out in the accompanying independent and dependent claims.

Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 5 shows formulas and equations underlying a first algorithm, as can be used to determine the position of the magnet of the system shown in FIG. 3.

FIGS. 6(a) to 6(c) show a vector representation illustrating the algorithm of FIG. 5 for a first exemplary angular position.

FIGS. 7(a) to 7(c) show a vector representation illustrating the algorithm of FIG. 5 for a second exemplary angular position.

FIGS. 8(a) to (e) show an abstract representation of angular position systems according to embodiments of the present invention, which can be seen as variants of the system of FIG. 3, where the planes of the sensor devices are parallel and perpendicular to the rotation axis, and where both sensor devices are located on the rotation axis.

FIG. 9 shows a variant of the formulas and equations of FIG. 5, as can be used to determine the position of the magnet of the system shown in FIG. 8(a) and FIG. 8(d).

FIG. 10 shows another variant of the formulas and equations of FIG. 5, as can be used to determine the position of the magnet of the system shown in FIG. 8(b) and FIG. 8(c) and FIG. 8(e).

FIG. 11 shows a schematic block-diagram of a system comprising two sensor devices as can be used in systems according to embodiments of the present invention.

FIG. 13 shows a first set of formulas and equations underlying an algorithm, as may be used to determine an angular position of the magnet of the arrangements show in FIG. 12.

FIG. 14 shows a second set of formulas and equations underlying an algorithm, as may be used to determine an angular position of the magnet of the arrangement shown in FIG. 12. A unique solution can be found by solving a set of 5 or 6 equations with 4 unknown.

FIG. 16 shows a set of formulas and equations underlying an algorithm, as may be used to determine an angular position of the magnet of the arrangement shown in FIG. 15. A unique solution can be found by solving a set of 2 or 3 equations with 1 unknown, being the unknown angular position $\alpha$.

FIG. 18 shows a set of formulas and equations underlying an algorithm, as may be used to determine an angular position of the magnet of the arrangements shown in FIG. 17. A unique solution can be found by solving a set of 2 or 3 equations with 1 unknown, being the unknown angular position $\alpha$.

Figure 1:
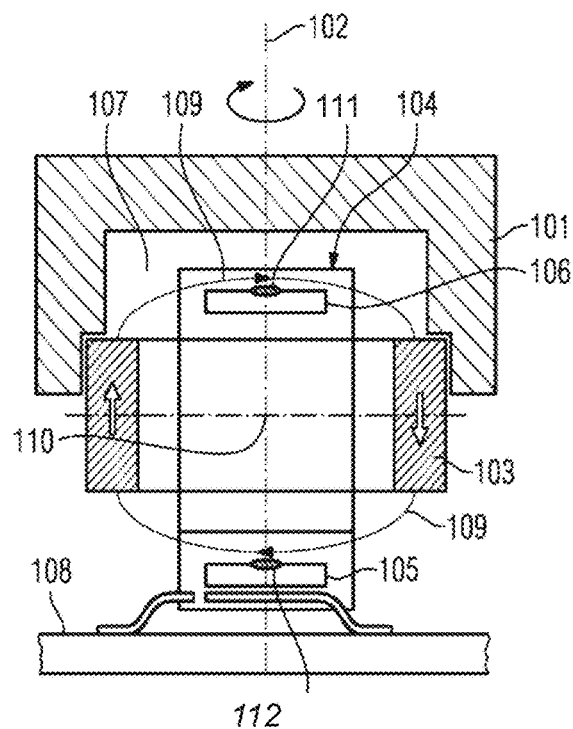
FIG. 1 is a replica of FIG. 1 of US2018087926A1.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "sensor" can refer to a magnetic sensor device, or a magnetic sensor element, depending on the context.

In this document, the term "sensor element" or "magnetic sensor element" refers to a component or a sub-circuit or a structure capable of measuring a magnetic quantity, such as for example a magneto-resistive element, a horizontal Hall plate, a vertical Hall plate, a Wheatstone-bridge containing at least one (but preferably four) magneto-resistive elements, etc.

In this document, the term "sensor device" or "magnetic sensor device" refers to an arrangement (e.g. on a semiconductor substrate or semiconductor die) of at least three sensor elements which are not collinear, e.g. at least four sensor elements which are located in a single plane. The sensor device may be comprised in a package, also called "chip", but that is not absolutely required.

In this document, the expression "in-plane components of a vector" and "X and Y component of a perpendicular projection of the vector in the plane" mean the same. In case of two sensor chips, each containing a semiconductor substrate, a projection of the magnetic field vectors in the planes defined by said substrates is meant.

In this document, the term "two vectors being parallel or anti-parallel" means that the two vectors define an angle of 0° or 180° with respect to each other. In other words, their carriers are parallel, but the vector may point in the same or opposite directions.

Unless explicitly mentioned otherwise, the expression "two vectors being parallel" means that their carriers are parallel, irrespective of their direction (same or opposite).

In this document the terms "magnetic field generator" and "magnetic source" mean the same, and may refer to an arrangement comprising one or more coils, or to an arrangement comprising one or more permanent magnets, or the like. The permanent magnet may be a dipole magnet, or a multi-pole magnet having at least four poles, or at least six poles, or at least eight poles. The permanent magnet may be a bar magnet or a ring magnet or a disk magnet, etc.

The present invention provides several angular position systems 300 (see FIG. 3), 801 to 805 (see FIG. 8a to FIG. 8e), 1200 (see FIG. 12), 1500 (see FIG. 15) and 1700 (see FIG. 17) and 1900 (see FIGS. 19(*a*) and 19(*b*)), and 2000 (see FIGS. 20(*a*) and 20(*b*)), and 2100 (see FIG. 21), and 2200 (see FIG. 22), and 2300 (see FIG. 2300) comprising a magnetic field generator 301, 1901 (e.g. an arrangement comprising one or more coils, or an arrangement comprising one or more permanent magnets, or a multi-pole magnet) rotatable about a longitudinal axis 305, for example as part of a rotor.

The magnetic field generator 301 is adapted for providing a first magnetic field vector B1mag to a first magnetic sensor device 303, and a second magnetic field vector B2mag to a second magnetic sensor device 304. The second magnetic field vector B2mag (e.g. expressed in absolute coordinates) is different from the first magnetic field vector B1mag, in magnitude and/or orientation and/or direction, preferably for all angular positions a of the magnetic field source.

In case of a linear position sensor where the magnetic source moves along a trajectory, e.g. a linear axis, the first and second magnetic sensor device preferably have a fixed distance and a fixed orientation relative to said axis.

In case of an angular position sensor, where the magnetic source is rotatable about a rotation axis, the first and second magnetic sensor device 303, 304 have a first and second position which is fixed with respect to a fixed point on the rotation axis, or fixed relative to a centre of the magnetic field generator. The first and second magnetic sensor device 303, 304 have a predefined first and second orientation relative to said point or said centre, which orientations are also fixed. The first and second sensor are typically mounted on a stator.

The first sensor device 303 is adapted for determining first vector data (e.g. v1x, v1y, v1z in case of a 3D sensor device, or v1x, v1y in case of a 2D sensor device) related to a combination of said first magnetic field vector B1mag and an external disturbance field Bext, if present. The first vector data may be expressed in a first local coordinate system (e.g. X1,Y1,Z1 in case of a 3D sensor, or X1,Y1 in case of a 2D sensor device).

The second sensor device 304 is adapted for determining second vector data (e.g. v2x, v2y, v2z in case of a 3D sensor device, or v2x, v2y in case of a 2D sensor device) related to a combination of said second magnetic field vector B2mag and the external disturbance field Bext, if present. The second vector data may be expressed in a second local coordinate system (e.g. X2,Y2,Z2 in case of a 3D sensor, or X2,Y2 in case of a 2D sensor device).

The linear or angular sensor system 300, 801 to 805, 1200, 1500, 1700, 1900, 2000, 2100, 2200, 2300 further comprises at least one processor 306, 307, 309 (see e.g. FIG. 11) adapted for receiving the first (raw uncorrected) vector data, e.g. (v1x, v1y, v1z) or (v1x, v1y) and the second vector data, e.g. (v2x, v2y, v2z) or (v2x, v2y), and adapted for determining a linear or an angular position of the magnetic field generator 301 based on the first vector data and the second vector data in a manner which substantially completely eliminates the external disturbance field Bext, even if a magnitude of the external disturbance field is in the same order as the field generated by the magnetic field generator, for example has a magnitude larger than 20% or larger than 50% of the magnitude of the magnetic field generated by the magnetic field generator.

In contrast to the system described in FIG. 1, where each sensor device merely provides an angle (which is a numerical value), each of the sensor devices 303, 304 of a system according to the present invention is capable of measuring and/or providing 2D or 3D vector information, meaning for example the X and Y coordinates of a projection of the magnetic field vector in the plane defined by the sensor device, or the X and Y and Z coordinates of the magnetic field vector measured by the sensor device. This is an important difference with the system shown in FIG. 1 and FIG. 2 where two sensors are used which are only capable of providing an angle, not a vector. At least one of the sensor devices 303, 304 is capable of outputting this vector information, e.g. by providing the vector information it has measured or determined to the other sensor device, e.g. via a serial bus 308 (see FIG. 11) or via a parallel bus interconnecting the two sensor devices.

In an embodiment one of the sensor devices (e.g. the first sensor device 303) provides its vector information to the other (e.g. the second sensor device 304), in which case a processor 307 in the second sensor device 304 will calculate the linear position x or angular position α of the magnetic source 301 based on the first vector information measured by and received from the first sensor device 303, and based on the second vector information measured by the second sensor device 304.

In an embodiment, both sensor devices 303, 304 provide their vector information to the other sensor device, and a first processor 306 in the first sensor device 303 and a second processor 307 in the second sensor device 304 both calculate said linear or angular position. This can be used for redundancy reasons or for fault detection.

In another or a further embodiment, both sensor devices 303, 304 provide their vector information to an external processor 309, for example to an on-board computing device, which then calculates said linear or angular position.

The vector information may be provided e.g. in the form of Cartesian coordinates (e.g. an X-coordinate and a Y-coordinate, or an X and Y and Z coordinate), or in the form of an amplitude and an angle (in case of a 2D sensor device) or in the form of an amplitude and two angles (in case of a 3D sensor device), but other coordinate systems such as for example cylindrical coordinates (Radius, Angle, Height), or spherical coordinates (Radius, angle1, angle2) may also be used.

Rather than relying on approximations (as is done in US2018087926A1), the inventors of the present invention found an improved algorithm for determining the angular position of the magnetic field source 301, which is based on several insights. It is a major advantage that the improved algorithm allows to determine the linear or angular position of the magnetic source 301 relative to the sensors, even if the external disturbance field is relatively large (e.g. has an amplitude as large as that of the magnetic field source), and irrespective of the orientation of the external disturbance field Bext. In other words, it is a major advantage that this method is "truly robust" to an external disturbance field.

One of the underlying ideas of the present invention is based on the insight that each sensor can measure a vector relative to its own local coordinate system, but since the relative positions and orientations of the two sensors is fixed, and is known, e.g. is predetermined by design (within some tolerance margins), or is measured after mounting, e.g. during a calibration test, the vector information obtained by the first and second sensor device, are related.

Another underlying idea of the present invention is based on the insight that the external disturbance field at the location of the first sensor device is substantially the same as the external disturbance field at the location of the second sensor device.

Yet another underlying idea of the present invention is based on the insight that the first magnetic vector measured by the first sensor device is the vector sum of the first magnetic field vector B1mag provided by the magnetic field source and a disturbance field vector Bext, and that the second magnetic vector measured by the second sensor device is the vector sum of the second magnetic field vector B2mag provided by the magnetic field source and the same disturbance field vector Bext.

Yet another underlying idea of the present invention is based on the insight that there is a relation between the first magnetic field vector B1mag created by, or originating from the magnetic field source and the second magnetic field vector B2mag created by, or originating from the magnetic field source, e.g. permanent magnet, which relation is known, e.g. is predetermined by design, or can be measured, e.g. during a calibration test. There are many arrangements possible where this relation can be expressed by means of a set of linear equations, which can first be solved to eliminate the external field, and the remaining equations can then be used to calculate the linear or angular position, e.g. using a goniometric function. It is a major advantage that the external disturbance field can be eliminated, e.g. completely eliminated by the set of linear equations.

Yet another underlying idea of the present invention is based on the insight that by measuring a sufficient number of field components, and by combining all the information from only two sensor devices, the (unknown) field components of the external disturbance field, as well as the unknown linear or angular position of the magnet, can be determined by solving a set of equations.

It is explicitly pointed out that the combination of all these insights is required to come to the solution provided by the present invention.

In the rest of this document, the principles of the present invention will be described for several exemplary arrangements, both simple arrangements as well as more complex arrangements, and several algorithms will be described to determine the linear or angular position of the magnetic source (e.g. relative to a reference position). Each version has its merits in terms of reduced complexity of the algorithm versus less stringent mounting requirements, but all versions are robust against an external disturbance field.

Figure 19A:
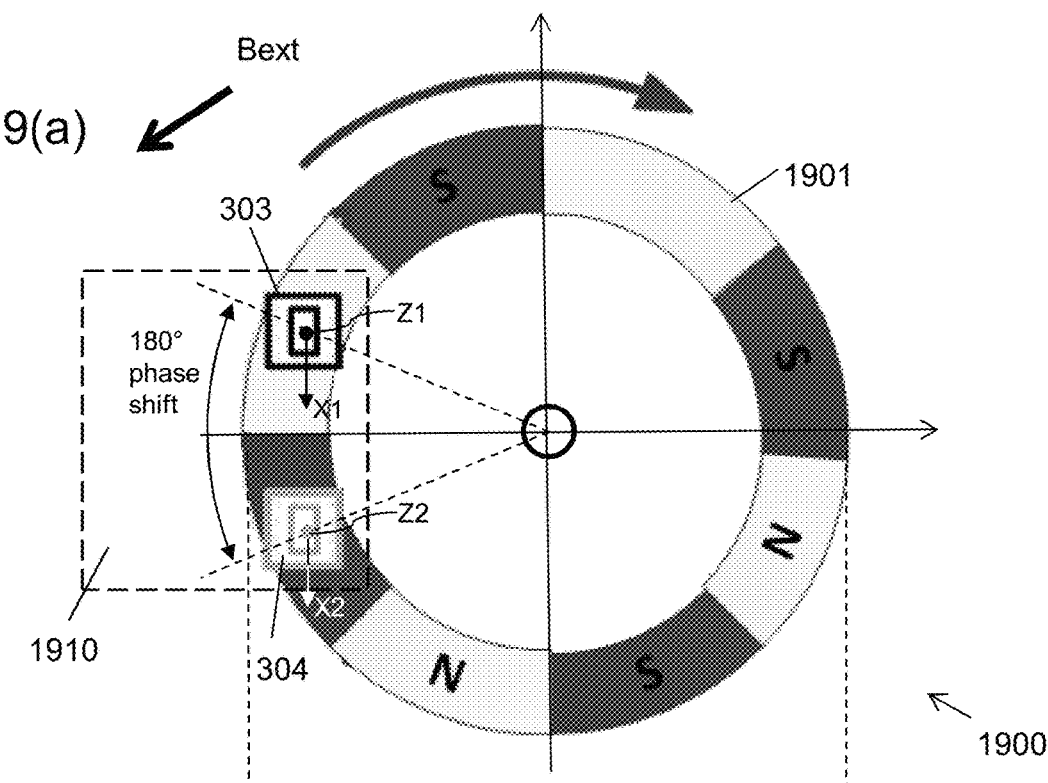
FIGS. 19(a) and 19(b) show another exemplary arrangement comprising a multi-pole magnetic source and two sensor devices arranged on a single side of the magnet, which sensor devices are oriented with their respective axes X, Y, Z in parallel, but spaced apart so as to measure substantially 180° phase shifted signals (originating from the magnet). The angular position can be calculated by means of an arctangent function, after first eliminating the external disturbance field by subtraction of corresponding signals.
Figure 19B:
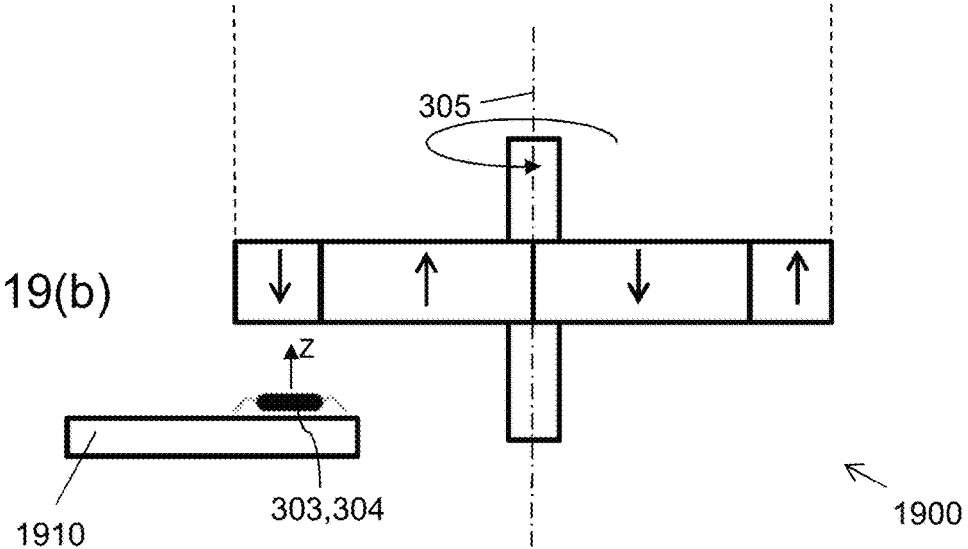

First (in FIG. 3 to FIG. 10) arrangements with many mounting constraints will be described, because methods to calculate the angular position is easy to understand. In these systems, both sensor devices can be 2D sensor devices capable of measuring magnetic field components in only two dimensions. Next, (in FIG. 12 to FIG. 18) more general arrangements are described, with relaxed mounting requirements, but requiring a more complex method to determine the angular position. In these systems one or both of the sensor devices needs to be a 3D sensor device. In FIGS. 19(a) and 19(b) another example of a 2D sensor system will be described. Finally, FIG. 19(a) to FIG. 23 other specific embodiments will be described.

Referring now to the Figures.

FIG. 1 is a replica of FIG. 1 of US2018087926A1, and shows a sensor system known in the art, comprising a permanent magnet 103 and a first "angle sensor device" 111 adapted for providing a first angle φ1, and a second angle sensor device 112 adapted for providing a second angle φ2 respectively. It is pointed out that these devices only provide an angle, and do not provide vector information.

Figure 2:
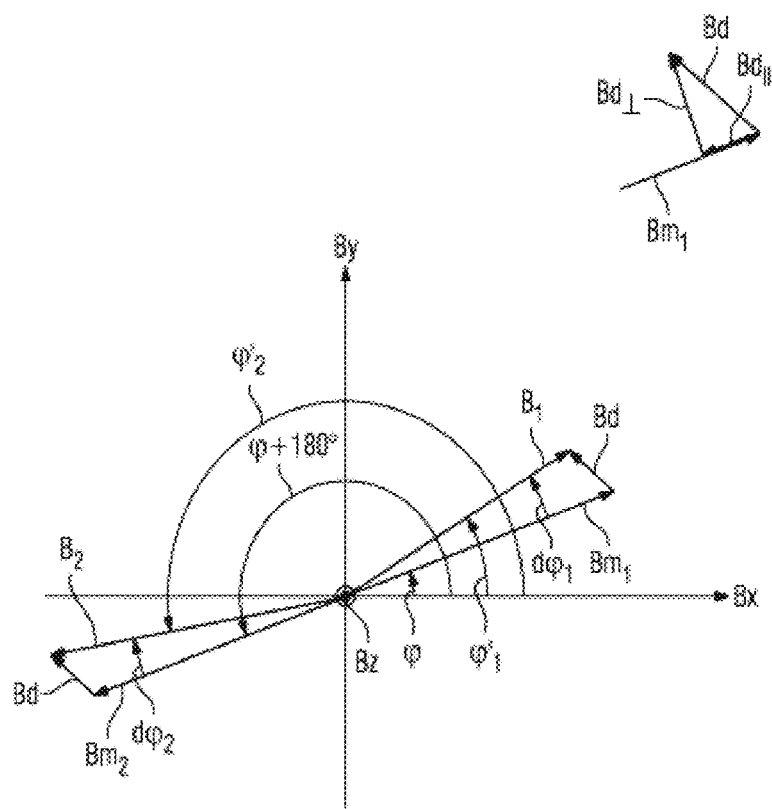
FIG. 2 is a replica of FIGS. 19(a) and 19(b) of US2018087926A1.

FIG. 2 is a replica of FIGS. 19(a) and 19(b) of US2018087926A1, and shows a first angle φ1 measured by the first sensor device 111, and a second angle φ2 measured by the second sensor device 112, in the presence of a disturbance field Bd. It is described in US'926 that, in case the disturbance field Bd is more than 10 times smaller than the field of the magnet Bm1, Bm2, a combination of the angles φ1 and φ2 can provide an angle with a reduced error caused by the disturbance field.

The inventors of the present invention also considered the arrangement of FIG. 1 and FIG. 2, and the problem of determining the angular position of the magnet 103 relative to the sensors 111, 112 in the presence of the external disturbance field Bd, but found another solution for addressing this problem. The solution proposed herein is capable of drastically reducing, or even completely eliminating the influence of the external field, irrespective of the direction of the external disturbance field, even if the amplitude of the disturbance field is up to about 20% or up to about 40% or up to about 50%, or up to about 60% or up to about 80% or even as large as that of the magnetic field generator, e.g. permanent magnet.

While the present invention is not limited to a permanent magnet as the only possible magnetic field generator, for ease of description, the principles of the present invention will be explained for a permanent magnet. Likewise, while the present invention is not limited to sensor devices with Cartesian coordinate systems, the principles of the present invention will be explained assuming Cartesian coordinate systems. The skilled person having the benefit of the present disclosure can easily extend the principles provided by the present invention to other magnetic sources and/or other coordinate systems.

Figures 3, 4:
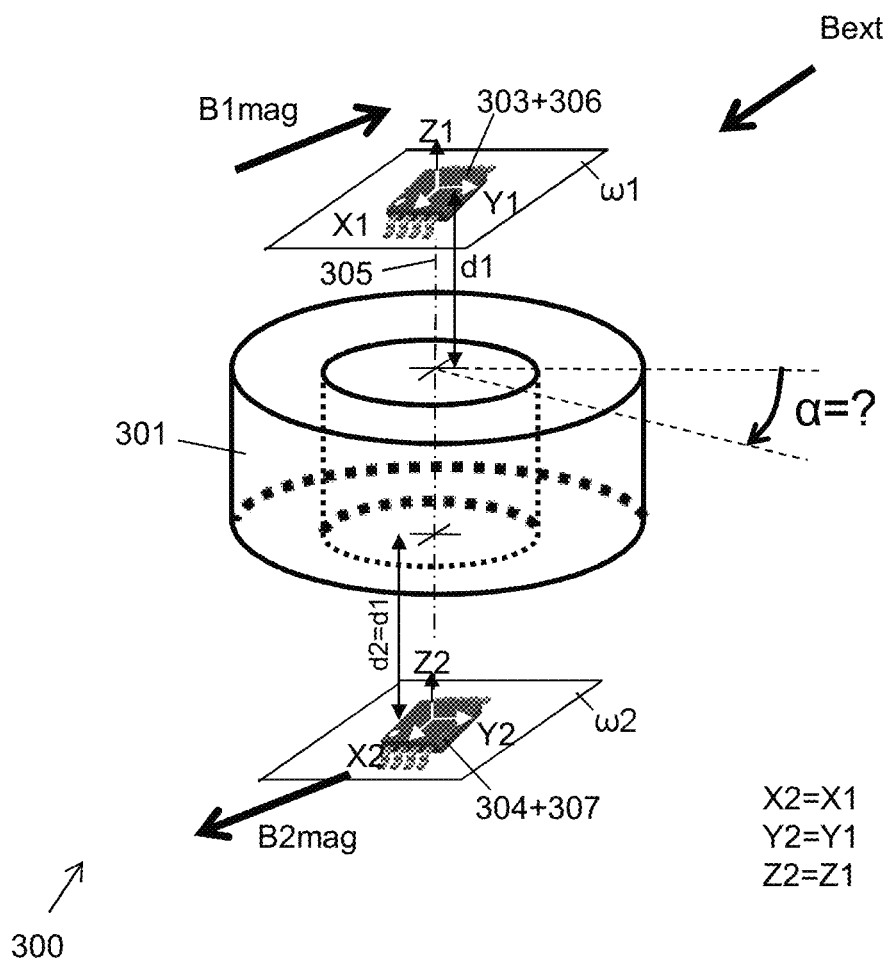
FIG. 3 shows an abstract representation of an angular position system according to a specific embodiment of the present invention.
FIG. 4 shows a set of 4 equations with 6 unknowns, which according to an insight underlying the present invention, is applicable to the system of FIG. 3.

FIG. 3 shows an abstract representation of an exemplary arrangement 300, for which the inventors wanted to determine the angular position α of the magnet 301 (e.g. mounted to a rotor, not shown) relative to a reference angle. The two sensor devices 303, 304 are arranged in a fixed position and orientation, for example to a stator (not explicitly shown).

The arrangement 300 of FIG. 3 shows:

a permanent magnet 301, in this example having the form of a ring magnet, but the present invention is not limited thereto, and other types of magnets can also be used. In the example of FIG. 3, the magnet 301 generates a first magnetic field vector B1mag measurable by the first sensor device 303, and a second magnetic field vector B2mag measurable by the second sensor device 304, which magnetic field vectors are anti-parallel relative to each other;

two sensor devices, a first sensor device 303 and a second sensor device 304, substantially located on the rotation axis 305. The first sensor device 303 has a first substrate defining a first plane ω1, and the second sensor device 304 has a second substrate defining a second plane ω2. The first plane and the second plane are parallel to each other and are perpendicular to the rotation axis 305, and are located on opposite sides of the magnet. Or stated in other words, the magnet is located between the first and the second sensor device. The first sensor device 303 has a first local coordinate system X1,Y1,Z1 and the second sensor device 304 has a second local coordinate system X2,Y2,Z2, and the two sensor devices are aligned such that X1 and X2 are parallel, Y1 and Y2 are parallel, and Z1 and Z2 are parallel. The Z-axes may coincide with the rotation axis 305.

the first magnetic sensor device 303 is capable of measuring in-plane components (i.e. components of a projection in the plane ω1) of the first (total) field vector B1total at a first location, and is optionally capable of making available (e.g. outputting) this first projected total vector information, e.g. in the form of two coordinates v1x, v1y.

the second magnetic sensor device 304 of is capable of measuring in-plane components (i.e. components of a projection in the plane ω2) of the second (total) field vector B2total at a second location different from the first location, and is optionally capable of making available (e.g. outputting) this second projected total vector information, e.g. in the form of two coordinates v2x, v2y.

The permanent magnet 301 is rotatable about an axis 305, to define an angle a relative to a reference position.

Based on the insights mentioned above, the inventors of the present invention realised that the system 300 depicted in FIG. 3 can be described mathematically by a set of four simultaneous equations in six unknowns, illustrated in FIG. 4, where (v1x, v1y) are the vector coordinates of the first total magnetic field B1mag in the first plane ω1, measured by the first sensor device 303, expressed relative to the X1 and Y1 axis, and where (v2x, v2y) are the vector coordinates of the second total magnetic field B2mag in the second plane ω2, measured by the second sensor device 304, expressed relative to the X2 and Y2 axis.

It is well known in the art that a set of 4 linear equations with 6 unknowns does not have a unique solution. Hence, at first sight, the problem seems unsolvable.

However, after investigating the arrangement of FIG. 3 more closely, the inventors came to the insight that, in case a first distance d1 between the magnet 301 and the first sensor 303, and a second distance d2 between the magnet 301 and the second sensor 304 are identical, (i.e. in case d1=d2 and the magnet is equally strong at the top and the bottom), then the magnitude |B1mag| of the first vector provided by the magnet is equal to the magnitude |B2mag| of the second vector provided by the magnet, in which case formula [51] and [52] of FIG. 5 apply. (In fact, these equations also apply for a magnet which is stronger at the top than at the bottom, or vice versa, if d1 and d2 are appropriately chosen).

Combining the formulas [51] and [52] of FIG. 5 with the set of equations [41] to [44] of FIG. 4, yields the set of four linear equations [53] to [56] in four unknowns (B1magx, B1magy, Bextx, Bexty), which has a unique solution, which can be determined for example as worked out further.

Formula [57] shows that the magnetic field B1mag created by the magnet at the location of the first sensor 303 can be obtained by determining the vector difference between the first total vector and the second total vector, divided by 2.0.

This is illustrated graphically in FIGS. 6(a) to 6(c) and FIGS. 7(a) to 7(c) for two exemplary orientations of the magnet, for a fixed orientation of the external disturbance field Bext, to illustrate in fact that this method works for any orientation of the external disturbance field, even if the magnitude of said external external field is about as large as the magnitude of the magnetic field created by the magnet.

FIG. 6(a) shows that the first sensor 303 would measure B1tot, being the vector sum of B1mag provided by the magnet, and the external disturbance field Bext.

FIG. 6(b) shows that the second sensor 304 would measure B2tot, being the vector sum of B2mag provided by the magnet, and the external disturbance field Bext.

FIG. 6(c) illustrates that, for the specific arrangement shown in FIG. 3, the vector difference B1tot−B2tot corresponds to 2*B1mag, and thus that B1mag can be calculated as (B1tot−B2tot)/2, where the external disturbance field Bext is completely eliminated. This is a completely different teaching than the one provided by US'926.

FIG. 7(a) to FIG. 7(c) show the similar situation as in FIG. 6(a) to FIG. 6(c), for the same external field Bext, when the magnet is rotated clockwise over about 45°. As can be seen, the same formulas apply, irrespective of the size and orientation of Bext relative to the magnet.

Referring back to FIG. 5, once the vector position (B1magx, B1magy) is known, the angular position α of the magnet 301 can be calculated. For example, in case the B1magx and B1magy values vary substantially like a cosine and sine signal, the angular position can be calculated using formula [59], or can be calculated using a look-up table optionally using linear interpolation, or can be calculated in other manners known per se in the art.

As can be appreciated from formula [53] to [56], the algorithm 500 described above needs the vector coordinates (v1x, v1y) of the total projected field measured by the first sensor device 303, and the vector coordinates (v2x, v2y) of the total projected field measured by the second sensor device 304. The algorithm can be executed for example by a processor 306 (see FIG. 11) embedded in the first sensor device 303, in which case the first and second sensor device 303, 304 would need to be interconnected and adapted such that the second sensor 304 can provide the second vector information to the first sensor device 303, or vice versa. The first sensor device 303 can then calculate the angular position α of the magnet as if the external disturbance field Bext was not there. In an automotive application, the processor 306 may communicate this angle α to an on-board computer and/or to other devices for further processing, for example for actuating a steering wheel or the like, but such aspects are outside the scope of the present invention.

In an embodiment, both sensor devices 303, 304 have an embedded processor 306, 307, and both sensor devices are adapted for providing its vector information to the other sensor device, and both sensor devices are adapted for calculating the angular position α (which is compensated for the external disturbance field) by performing the algorithm 500 described above, and both devices are adapted for providing this angle to said on-board computer or other device. In this way, a fault condition may be detected, since both values should be identical.

In yet another embodiment, the algorithm 500 is not performed by a processor 306, 307 embedded inside the sensor devices 303, 304, but is performed by a processor 309 external to the sensor devices, for example in the example above, by said on-board computer. In this case, each of the sensor devices would be adapted to provide its vector information to said board computer, for example via leads or wires 308 or cables or wireless (e.g. optical or via RF), or in any other suitable way. Of course separate leads or tracks or wires or cables may also be provided between the sensor devices and the external processor 309.

But the inventors went one step further, and realized that the set of equations [41] to [44] can also be solved if the magnetic field vectors B1mag and B2mag are not parallel or anti-parallel, and/or if the orientation of the first and second sensor device 303, 304 is not perfectly aligned (e.g. if X1 is not parallel with X2 and Y1 is not parallel with Y2).

FIG. 8(a) to FIG. 8(e) shows several variants of the arrangement of FIG. 3. It is noted that in FIG. 8(a) to FIG. 8(e) the sensor devices are not explicitly shown (but a cross is shown instead), and the coordinate axes have been shifted somewhat, in order to keep the drawings readable. As can be seen, in the embodiments shown in FIG. 8(a) to FIG. 8(e) the first plane ω1 of the first sensor device 303 and the second plane ω2 of the second sensor device 304 are still parallel to each other and perpendicular to the rotation axis 305.

For simplifying the description, it is assumed in the drawings of FIG. 8 that the magnet is symmetrical in the sense that the field strength at a certain distance from the top of the magnet is as large as the field strength at the same distance from the bottom of the magnet. Thus, in the examples of FIG. 8, d1=d2 actually means that the magnitude of |B1mag| is equal to the magnitude of |B2mag|, and d1<>d2 actually means that the magnitude of |B1mag| is different from the magnitude of |B2mag|.

In FIG. 8(a) to FIG. 8(c) the sensor devices are located on opposite sides of the magnet, and
In FIG. 8(a), X1 is parallel to X2, but d1≠d2.
In FIG. 8(b) d2=d1, but X1 is not parallel to X2,
In FIG. 8(c) d1≠d2 and X1 is not parallel to X2,
In FIG. 8(d) and FIG. 8(e) the sensor devices are located on the same side of the magnet, and
In FIG. 8(d), X1 is parallel to X2, but d1≠d2,
In FIG. 8(e), X1 is not parallel to X2, and d1≠d2.

Considering the arrangement of FIG. 8(a) and FIG. 8(d), the inventors came to the further insight that also in this case, there is a simple relation between the field B1mag created by the magnet at the first sensor position and the field B2mag created by the magnet at the second sensor position, which can be mathematically expressed by the formulas [91] and [92] shown in FIG. 9, where "k" is a constant floating point number which can be determined by calibration.

In the example of FIG. 8(a) the value of "k" will typically be negative. In the example of FIG. 8(d), the value of "k" will typically be positive. It can be seen that the formulas [51] and [52] are a special case of the formulas [91] and [92] for the value k=−1.0.

Combining the formulas [91] and [92] with the set of equations [41] to [44] yields the set of four linear equations [93] to [96] in four unknowns (B1magx, B1magy, Bextx, Bexty), which has a unique solution, as can be appreciated from formula [97] and formula [98].

Similar as above, once the vector position (B1magx, B1magy) is known, the angular position α of the magnet 301 (e.g. relative to a reference position, or e.g. relative to a stator) can be calculated, for example using the formula [99] if B1magx and B1magy vary like a cosine and sine function respectively, or using a look-up table (optionally with linear interpolation), or in any other suitable way.

Compared to the special case of FIG. 3, the embodiments of FIG. 8(a) and FIG. 8(d) offer the advantage that the distance d1 and d2 need not be exactly the same, and/or that the strength of the magnetisation does not need to be exactly the same at the top and the bottom of the magnet, which reduces the mounting requirements. This may also help to improve accuracy in case the magnet is not symmetrically magnetized, but is somewhat stronger at the top and somewhat weaker at the bottom, or vice versa.

Considering the arrangement of FIG. 8(b) and FIG. 8(c) and FIG. 8(d), the inventors came to the further insight that there is also a relation between the first field vector B1mag and Bext measured by the first sensor device 303 and expressed in terms of the first coordinate system X1,Y1,Z1 on the one hand, and the second field vector B2mag and Bext measured by the second sensor device 304 and expressed in terms of the second coordinate system X2,Y2,Z2 on the other hand, which can be mathematically expressed by the formulas [101] and [102] shown in FIG. 10, and similar formulas (not shown) for the external disturbance field, where m, n, p, q, r, s are constant floating point numbers which are predetermined by design, or can be determined by calibration.

It is pointed out that in some embodiments of the present invention, some of the values m, n, p, q, r and s may be equal to zero. In some embodiments of the present invention, one or both of the values "p" and "s" is non-zero, which allows to take into account further mounting anomalies and/or some non-ideal magnetization, or combinations hereof.

It can be understood that the formulas [91] and [92] are a special case of the formulas [101] and [102] for the case where m=r=k and n=q=s=0.

Combining the formulas [101] and [102] with the set of equations [41] to [44] yields the set of four linear equations [103] to [106] in four unknowns (B1magx, B1magy, Bextx, Bexty), which has a unique solution.

Similar as above, once the vector position (B1magx, B1magy) is known, the angular position α of the magnet 301 can be calculated, for example by using the formula [109], or using a look-up table optionally with linear interpolation, or in any other suitable way.

As compared to the special case of FIG. 3, the embodiments of FIG. 8(b), FIG. 8(c) and FIG. 8(d) offer the advantage that the field strength at top and bottom and/or the distance d1 and d2 need not be the same, and also the orientation of the sensor devices 303, 304 need not be exactly the same (but can be rotated over an angle β), which reduces the mounting requirements even further, and/or may increase the accuracy of the angular position system even further.

It is noted that, in all of the embodiments described in FIG. 5 to FIG. 10, also the values of Bextx and Bexty may be calculated, which may be used for diagnostic purposes, but that is not absolutely required for determining the angular position α of the magnet (e.g. mounted on a rotor).

FIG. 11 shows a block-diagram of an exemplary embodiment of a first and second sensor device 303, 304 which are interconnected via leads or wires, e.g. via a serial bus 308. The bus 308 may also be interconnected to other devices, e.g. to an external processor 309.

In the example shown, each of the first and second sensor 303, 304 has a processor 306, 307, e.g. in the form of a programmable microcontroller, one or both of which may be adapted for performing said algorithm 500 or 900 or 1000. The algorithm may be stored as a set of executable instructions in a memory connected to said processor.

The working of magnetic sensor devices is well known in the art, and hence need not be explained in further detail. It suffices to understand the present invention that each sensor device preferably contains at least three magnetic sensitive elements, e.g. in the form of Hall plates or magneto-resistive elements, which are not collinear, and thus define a plane. Furthermore, each sensor device is capable of determining a 2D or 3D vector of a (total) magnetic field relative to the sensor device, and at least one of the sensor devices 303, 304 is adapted for providing the measured vector to the other sensor device.

Alternatively, the algorithm 500, 900, 1000 of calculating the angular position α of the magnet is performed by the external processor 309, in which case the first sensor device will provide first 2D or 3D vector information to the external processor, and the second sensor device will provide second 2D or 3D vector information to the external processor 309, based on which the external processor can calculate the angular position α, for example using any of the algorithms described above.

But the inventors went still further, and came to the insight that it is not absolutely required that the first and second sensor device are located on the rotation axis 305, and/or that the first and second plane ω1, ω2 defined by the sensor devices are parallel to one another and perpendicular to the rotation axis. While it is true that such arrangements can simplify the equations, and allow that two-dimensional sensor devices are used, the underlying ideas of the present invention can be broadened.

In other words, the arrangements of FIG. 3 and FIG. 8(a) to FIG. 8(e) illustrate the relatively simple case where the sensor devices are 2D devices, which only need to measure an in-field vector because the two planes are parallel, but in case the sensor devices can measure a 3D vector, the limitation of parallel planes is no longer required. In addition, also the requirement that the first magnetic field vector B1mag and the second magnetic field vector B2mag are parallel or anti-parallel, and/or that the first and second magnetic field vector need to have a magnitude with a constant ratio for all angular positions, can be omitted.

Figure 12:
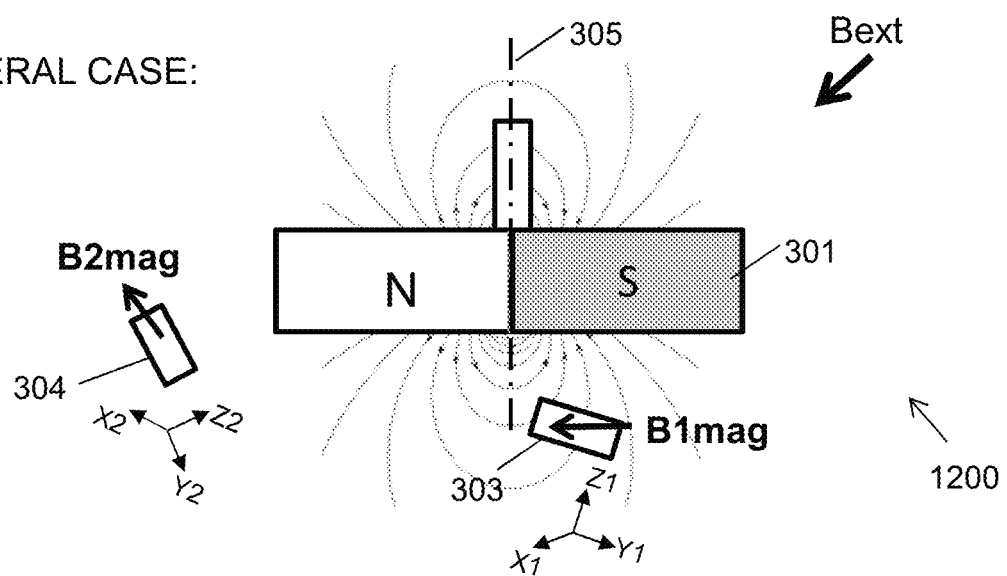
FIG. 12 shows a more general arrangement of an angular position system according to embodiments of the present invention, where the sensor devices may or may not be located on the axis, and where the planes of the sensor devices may or may not be parallel, and where the planes of the sensor devices may or may not be perpendicular to the rotation axis, and where some or all of the axes of the sensor devices may or may not be aligned.

FIG. 12 shows a more general arrangement of an angular position system 1200 according to embodiments of the present invention, where the first and second sensor device 303, 304 may or may not be located on the rotation axis 305, and where the planes ω1, ω2 of the first and second sensor device may or may not be parallel, and where the planes of the sensor devices may or may not be perpendicular to the rotation axis 305, and where none or only one or all three of the axes X1, Y1, Z1 and X2, Y2, Z2 of the sensor devices may or may not be aligned.

More in particular, FIG. 12 shows an arrangement of a magnetic source 301 and a first and a second sensor device 303, 304, with an indication of their respective coordinate systems X1,Y1,Z1 and X2,Y2,Z2, which in the example of FIG. 12(a) assume arbitrary orientations.

FIG. 13 shows a set of formulas and equations underlying an algorithm or method 1300, as may be used to determine an angular position of the magnet of the arrangement shown in FIG. 12.

In formulas [1301] to [1303] the components B2magx, B2magy, B2magz of the second magnetic field vector B2mag generated by the magnetic field source at the second sensor location is expressed as a function of the components B1magx, B1magy, B1magz of the first magnetic field vector B1mag generated by the magnetic field source at the first sensor location, for a given arrangement, meaning, for a given fixed position and orientation of the sensor devices and the magnetic source.

As the external disturbance field Bext is assumed to be constant, formulas [1304] to [1306] express that the external field components Bextx2, Bexty2, Bextz2 measured by the second sensor device can be calculated as a linear combination of the external field components Bextx1, Bexty1, Bextz1. This can also be written in matrix-notation using two 3×1 matrices, and a 3×3 transformation matrix. The values "a" to "i" are known floating point numbers, e.g. predetermined by design, or determined by simulation or by calibration, or in any other way.

Formulas [1307] to [1309] are similar to formulas [41] to [42] extended to three dimensions.

Formulas [1310] to [1312] are similar to formulas [43] to [44] extended to three dimensions, and then combined with formulas [1301] to [1306].

The set of formulas [1307] to [1312] forms a set of 6 equations in 6 unknowns (B1magx, B1magy, B1magz, Bextx, Bexty, Bextz) expressed in the first coordinate system, where the functions f1, f2 and f3 and the values "a" to "i" are known, e.g. by design or by simulation or by calibration, or combinations hereof. This set of equations has a single solution for B1magx, B1magy and B1mayz, from which the angular position α can be derived, for example using a lookup-table.

While the formulas of FIG. 13 are theoretically correct, and demonstrate or at least make plausible that the angular position can be found in a manner that completely eliminates the external field, this formulation may not be easy in practice.

FIG. 14 shows another set of formulas and equations underlying an algorithm or method 1400, as may be used to determine an angular position α of the magnetic source 301 of the arrangement shown in FIG. 12.

In formulas [1401] to [1403] the X, Y and Z components of the first magnetic field vector B1mag generated by the magnetic field source at the first sensor location are expressed as functions of the angular position α, and in formulas [1404] to [1406] the X, Y and Z components of the second magnetic field vector B2mag generated by the magnetic field source 301 at the second sensor location are expressed as functions of the angular position α. The functions g1 to g6 are known, e.g. by design or by simulation, or can be determined during a calibration test.

The formulas [1304] to [1306] as described in FIG. 13, are still applicable, allowing to express the external disturbance field components measured by the second sensor device to be expressed as a linear combination of the external disturbance field components measured by the first sensor device. As mentioned above, the values "a" to "i" are floating point numbers, which are known.

The values of the functions g1 to g6 may be determined for a plurality of values of α, and then stored in a non-volatile memory 321, 322, 323 of the device (see FIG. 11), optionally in a compressed manner. The values of "a" to "i" would also be stored in said memory.

Formulas [1407] to [1409] are similar to formulas [41] to [42] extended to three dimensions.

Formulas [1410] to [1412] are similar to formulas [43] to [44] extended to three dimensions, and then combined with formulas [1401] to [1406] and formulas [1304] to [1306], resulting in a set of 6 equations with 4 unknowns α, Bextx1, Bexty1, Bextz1.

This is an overspecified set of equations which has a single solution, from which the angular position α can be calculated in known manners, for example using an iterative process.

In a variant of the system shown in FIG. 12, and the method 1400 of FIG. 14, the first sensor device 303 is a 3D device, and the second sensor device 304 is a 2D device, and the set of equations is a subset of the set of equations shown in FIG. 14, where equation [1406] and equation [1412] are omitted, and where V1x, V1y, V1z, V2x, V2y are measured, resulting in a set of 5 equations with 4 unknowns. This is an overspecified set of equations which has a single solution, from which the angular position α can be calculated in known manners, for example using an iterative process.

Other variants are also contemplated, e.g. where the position and/or the orientation of one or both of the sensor devices is "special".

Figure 15:
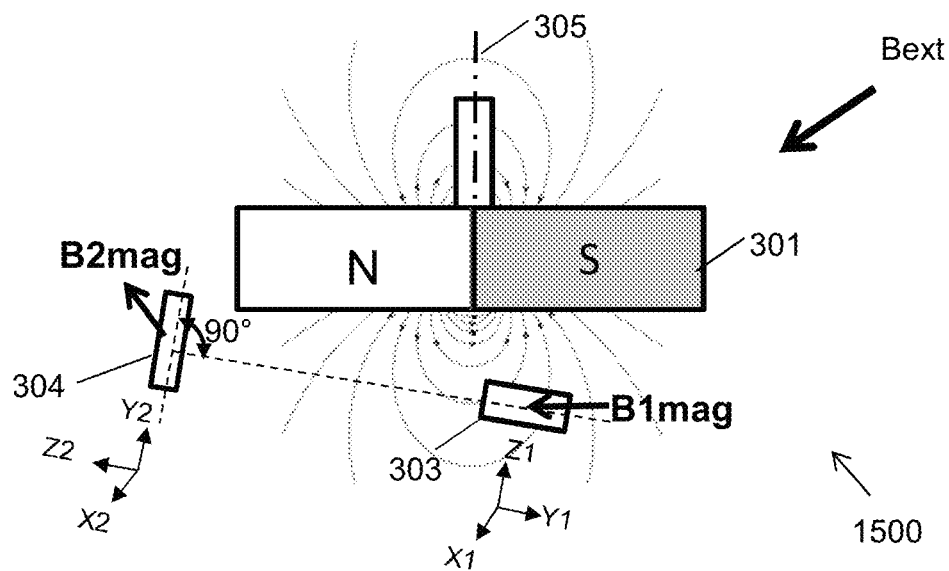
FIG. 15 shows an exemplary arrangement of a magnetic source and two sensor devices, which can be seen as a special case of FIG. 12, where the sensor devices define planes which are oriented orthogonally.

FIG. 15 shows an exemplary arrangement of a magnetic source and two sensor devices, which can be seen as a special case of FIG. 12, where the sensor devices 303, 304 define a first and a second plane ω1, ω2 which are oriented orthogonally with respect to each other. In the example shown in FIG. 15, the X2 axis of the second sensor is aligned with the X1 axis of the first sensor, Y2 is aligned to Z1 and Z2 is aligned to −Y1.

FIG. 16 shows a set of formulas and equations underlying an algorithm or method 1600, as may be used to determine an angular position of the magnet source of the arrangements shown in FIG. 15. By setting the values a=+1, f=+1, h=−1, and b=c=d=e=g=i=0 in equation [1410] to [1412], the set of equations [1607] to [1612] can be obtained. The values of the external field components can be eliminated from this set of equations, for example as shown by the set of equations [1613] to [1615], resulting in a set of 3 equations in 1 variable α.

This is an overspecified set of equations which has a single solution, from which the angular position α can be calculated in known manners, for example using an iterative process.

In a variant of the system of FIG. 15 and the method 1600 of FIG. 16, the first sensor device 303 is a 3D device, and the second sensor device 304 is a 2D device, and the set of equations is a subset of the set of equations shown in FIG. 16, where equation [1606] and equation [1612] are omitted, and where V1x, V1y, V1z, V2x, V2y are measured, resulting in a set of 2 equations with 1 unknown. This is an overspecified set of equations which has a single solution, from which the angular position α can be calculated in known manners, for example using an iterative process.

Figure 17:
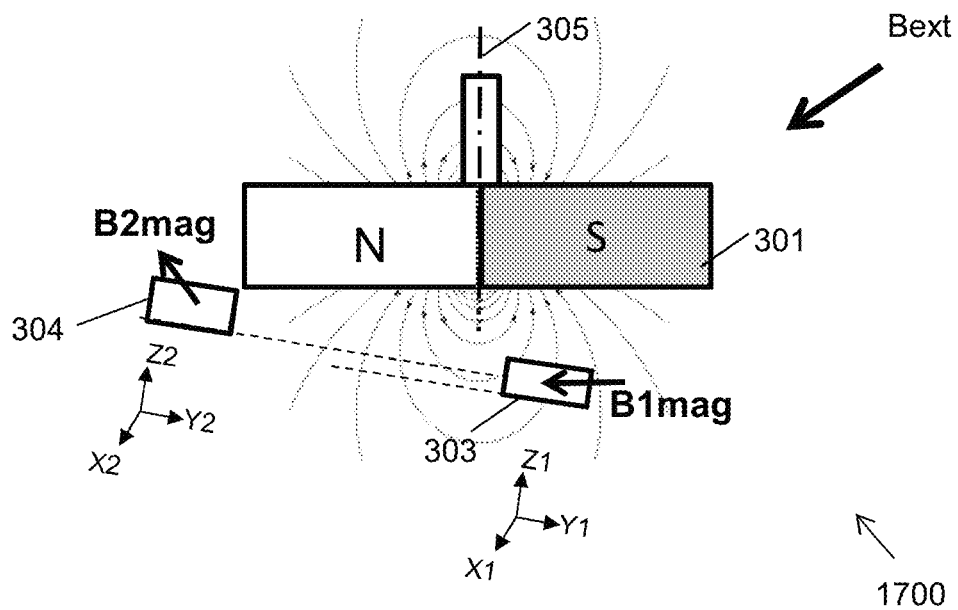
FIG. 17 shows an exemplary arrangement of a magnetic source and two sensor devices, which can be seen as a special case of FIG. 12, where the sensor devices are fully aligned, in the sense that the corresponding X,Y,Z axes of their local coordinate systems are parallel.

FIG. 17 shows an exemplary arrangement of a magnetic source 301 and two sensor devices 303, 304, which can be seen as another special case of FIG. 12, where the sensor devices 303, 304 define a first and a second plane ω1, ω2 which are oriented parallel with respect to each other.

In the example shown in FIG. 17, the first coordinate system X1,Y1,Z1 is fully aligned with the second coordinate system X2,Y2,Z2. The two planes may even be a single plane, for example a single PCB, although that is not absolutely required.

FIG. 18 shows a set of formulas and equations underlying an algorithm or method 1800, as may be used to determine an angular position of the magnet source of the arrangement shown in FIG. 17. By setting the values a=+1, e=+1, i=+1, and b=c=d=f=g=h=0 in equation [1410] to [1412], the set of equations [1807] to [1812] can be obtained. The values of the external field components can be eliminated from this set of equations, for example as shown by the set of equations [1813] to [1815], resulting in a set of 3 equations in 1 variable α.

This is an overspecified set of equations which has a single solution, from which the angular position α can be calculated in known manners, for example using an iterative process.

In a variant of the system of FIG. 15 and the method 1800 of FIG. 18, the first sensor device 303 is a 3D device, and the second sensor device 304 is a 2D device, and the set of equations is a subset of the set of equations shown in FIG. 18, where equation [1806] and equation [1812] are omitted, and where V1x, V1y, V1z, V2x, V2y are measured, resulting in a set of 2 equations with 1 unknown. This is an overspecified set of equations which has a single solution, from which the angular position α can be calculated in known manners, for example using an iterative process.

Many specific arrangements are possible, for example, in a particular embodiment, the magnet is a two pole disk magnet or a two pole ring magnet, and one of the sensors is located on the rotation axis 305, and the other sensor device is arranged in the plane of the ring or disk magnet, radially outside the ring or disk. In other embodiments, the magnet is a multi-pole disk magnet or a multi-pole ring magnet, having at least four poles, or at least six poles.

FIGS. 19(a) and 19(b) shows another exemplary sensor arrangement 2000 comprising a multi-pole magnetic source (e.g. an eight-pole ring magnet) and two 2D-sensor devices arranged on a single side of the magnet, for example facing the upper surface or facing the bottom surface. FIG. 19(a) shows a bottom view, FIG. 19(a) shows a front view of the sensor arrangement. The ring magnet may be axially magnetized (i.e. in the Z-direction).

The sensor devices 303, 304 are aligned such that their respective axes X1 and X2, and Z1 and Z2 are oriented parallel. The two sensor devices 303, 304 are spaced apart over "one pole distance", hence the signals measured by the two devices are substantially 180° phase shifted (in the absence of a disturbance field). This requires an accurate positioning of the sensor devices 303, 304 relative to the magnet. It is pointed out, however, that a single printed circuit board (PCB) 1910 having particular dimensions may be used with magnets having various sizes, by a proper positioning of the PCB relative to the sensor axis 305. Indeed, the angular distance between the two sensor devices as seen from the axis 305 can be increased by mounting the PCB closer to the rotation axis, or can be decreased by mounting the PCB further away from the axis 305.

In an embodiment, the first sensor device 303 measures an in-plane field component Bx1 and an out-of-plane field component Bz1, and the second sensor device measures an in-plane field component Bx2 and an out-of-plane field component Bz2, and formulas similar to those of FIG. 5 are used to calculate the relative angular position, namely:

$$B2\text{mag}x = -B1\text{mag}x \qquad [19.1]$$

$$B2\text{mag}z = -B1\text{mag}z \qquad [19.2]$$

because sensor1 and sensor2 are spaced substantially over one pole distance,

SensorA will measure:

$$V1x = B1\text{mag}x + B\text{ext}x \qquad [19.3]$$

$$V1z = B1\text{mag}z + B\text{ext}z \qquad [19.4]$$

SensorB will measure:

$$V2x = B2\text{mag}x + B\text{ext} = -B1\text{mag}x + B\text{ext}x \qquad [19.5]$$

$$V2z = B2\text{mag}z + B\text{ext} = -B1\text{mag}z + B\text{ext}z \qquad [19.6]$$

Formula [19.3]-[19.5] yields: V1x−V2x=2*B1magx, thus:

$$B1\text{mag}x = (V1x - V2x)/2 \qquad [19.7]$$

Formula [19.4]-[19.6] yields: V1z−V2z=2*B1magz, thus:

$$B1\text{mag}z = (V1z - V2z)/2 \qquad [19.8]$$

The Bx and Bz field components of the magnetic field measured at the sensor locations as shown are substantially 90° phase shifted, hence:

$$B1\text{mag}x \sim \cos(\alpha)$$

$$B1\text{mag}z \sim \sin(\alpha)$$

Then: $tg(\alpha) = B1\text{mag}z/B1\text{mag}x$

And: $\alpha = \arctan(B1\text{mag}z/B1\text{mag}x)$ [19.9]

Instead of an arctangent function, a look-up table, optionally with interpolation can be used to determine the angular position.

Each sensor device may comprise for example one Horizontal Hall element (to measure the Bz component) and one vertical Hall element (to measure the Bx-component), but the present invention is not limited thereto, and other sensors can also be used.

In another example, the sensor devices may comprise two horizontal Hall elements arranged on opposite sides of a circular integrated magnetic concentrator (IMC). The Bz component can then be determined by calculating the sum of the two signals obtained from the Hall elements, and the Bx component can be determined by calculating the difference of the two signals obtained from the Hall elements.

In a variant of FIGS. 19(a) to 19(b), the ring magnet 1901 is replaced by a disk magnet.

The inventors surprisingly found that it is actually not required that the sensors are located at one pole distance for receiving 180° phase shifted signals originating from the magnet, but the invention also works for distances in the range from about 0.1 to about 1.9 pole distances, or from about 0.17 to about 1.83 pole distances, the latter corresponding to a phase shift from about 30° to about 330°. The signal amplitude (hence the SNR) is largest for 180° phase shift, but does not dramatically decrease for other distances. Even more surprisingly, exactly the same formulas as above are applicable. This offers the advantage that the mounting tolerances of the PCB can be drastically relaxed. Depending on the distance between the sensor devices, the angular offset position relative to the "zero position" will vary. In some applications (e.g. where the angular speed is determined as the time derivate of the angular position), the this offset is irrelevant. In other applications, where the offset is important, a precise position can be obtained e.g. by accurate positioning of the PCB (without having to perform a calibration test), and/or by performing a calibration test. In the latter case, the mounting requirements can be drastically reduced.

Figure 20A:
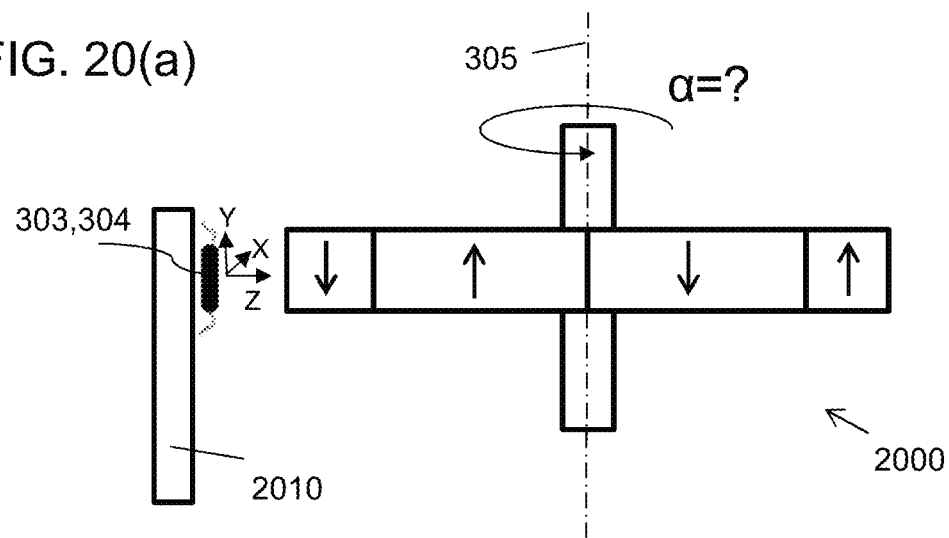
FIGS. 20(a) and 20(b) show yet another exemplary arrangement comprising a multi-pole magnetic source and two sensor devices arranged so as to face an outer perimeter of a ring magnet or disk magnet, which sensor devices are oriented with their respective axes X, Y, Z in parallel, but spaced apart so as to measure substantially 180° phase shifted signals (originating from the magnet). The angular position can be calculated by means of an arctangent function, after first eliminating the external disturbance field by subtraction of corresponding signals.
Figure 20B:
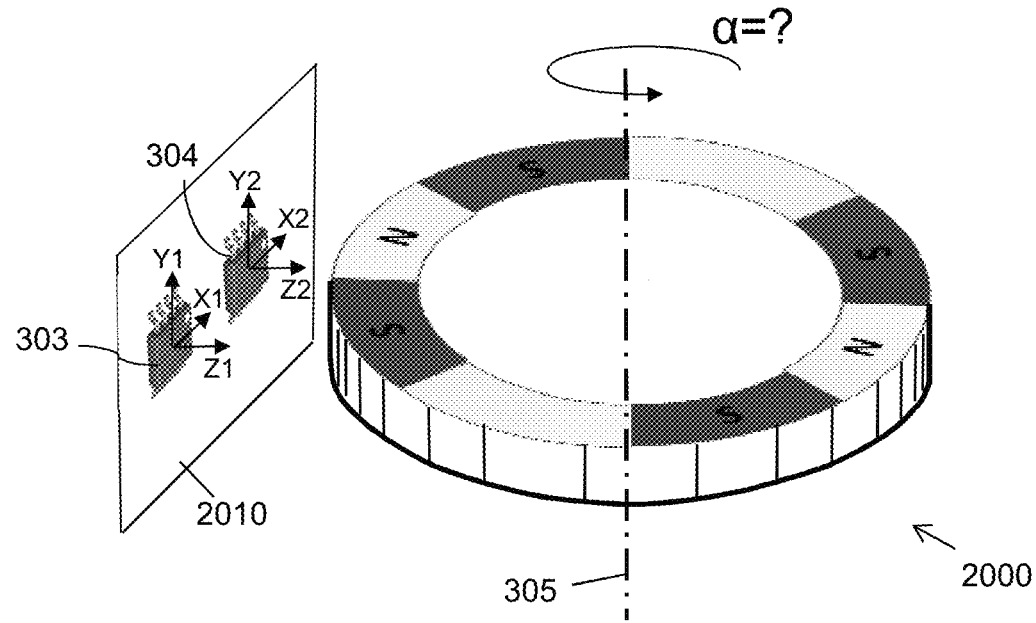

FIGS. 20(a) and 20(b) show another exemplary arrangement comprising a multi-pole magnetic source (e.g. an eight-pole ring magnet, or a ring magnet with more than eight poles) and two 2D or 3D-sensor devices arranged so as to face an outer perimeter or outer circumference of the magnet.

The sensor devices 303, 304 are aligned such that their respective axes X1 and X2, and Z1 and Z2 are oriented parallel. In the example shown in FIGS. 20(a) and 20(b), the two sensor devices 303, 304 are spaced apart over "one pole distance", hence the signals measured by the two devices are substantially 180° phase shifted. This requires an accurate positioning of the sensor devices 303, 304 relative to the magnet.

As in the embodiment of FIGS. 19(a) and 19(b), the first sensor device 303 measures an in-plane field component Bx1 and an out-of-plane field component Bz1 at a first position, and the second sensor device measures an in-plane field component Bx2 and an out-of-plane field component Bz2 at a second position, and the same formulas [19.1] to [19.9] are also applicable here.

The inventors surprisingly found that also in this case, it is not required to position the two sensor devices at one pole distance, and the invention will also work for other distances, e.g. a distance in the range from 0.1 to 1.9 pole distances or from 0.2 to 1.8 pole distances, or from 0.5 to 1.5 pole distances. The same comments as mentioned above for FIGS. 19(a) and 19(b) (e.g. with respect to the formulas, the SNR, accurate position versus calibration, and offset position) are also applicable here.

Figure 21:
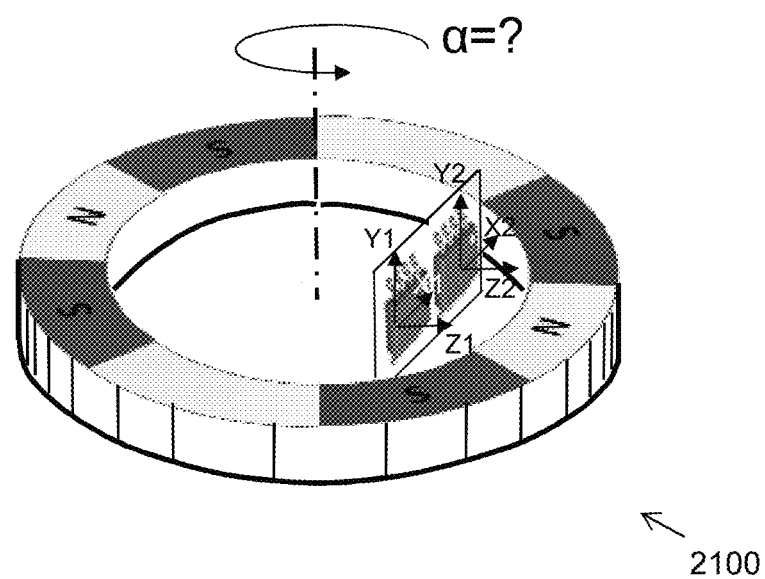
FIG. 21 shows yet another exemplary arrangement comprising a multi-pole magnetic source and two sensor devices arranged so as to face an inner perimeter of a ring magnet, which sensor devices are oriented with their respective axes X, Y, Z in parallel, but spaced apart so as to measure substantially 180° phase shifted signals (originating from the magnet). The angular position can be calculated by means of an arctangent function, after first eliminating the external disturbance field by subtraction of corresponding signals.

FIG. 21 shows another exemplary arrangement comprising a multi-pole magnetic source (e.g. an eight-pole ring magnet, or a ring magnet with less than eight, or more than eight poles, e.g. only four poles or only six poles, or ten poles, etc), and two 2D or 3D-sensor devices arranged so as to face an inner perimeter of the ring magnet. In other words, the sensor chips are arranged in the central opening of the magnet.

The two sensor devices 303, 304 are aligned such that their respective axes X1 and X2, and Z1 and Z2 are oriented parallel. The two sensor devices 303, 304 are spaced apart over "one pole distance", hence the signals measured by the two devices are substantially 180° phase shifted. This requires an accurate positioning of the sensor devices 303, 304 relative to the magnet.

As in the embodiment of FIGS. 19(a) and 19(b) and FIGS. 20(a) and 20(b), the first sensor device 303 measures an in-plane field component Bx1 and an out-of-plane field component Bz1 at a first position, and the second sensor device measures an in-plane field component Bx2 and an out-of-plane field component Bz2 at a second position, and the same formulas [19.1] to [19.9] are also applicable here.

It is an advantage of the sensor system of FIG. 21 that the sensor devices can be arranged closer together, and may even be integrated in a single package.

The inventors surprisingly found that also in this case, it is not required to position the two sensor devices at one pole distance, and the invention will also work for other distances, with the same formulas. The same comments as mentioned above for FIGS. 19(a) and 19(b) and FIGS. 20(a) and 20(b) are also applicable here.

Figure 22:
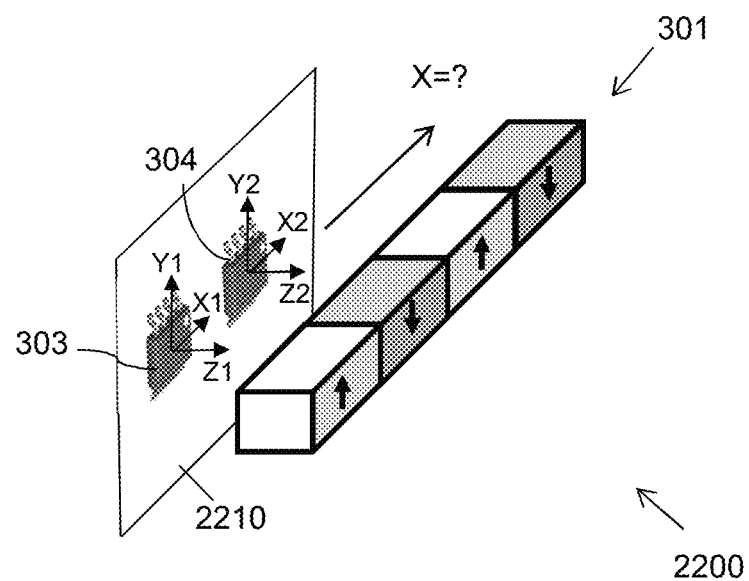
FIG. 22 shows a linear position sensor system 2200 according to an embodiment of the present invention, which can be seen as a variant of the system shown in FIGS. 20(a) and 20(b) or FIG. 21.
Figure 23:
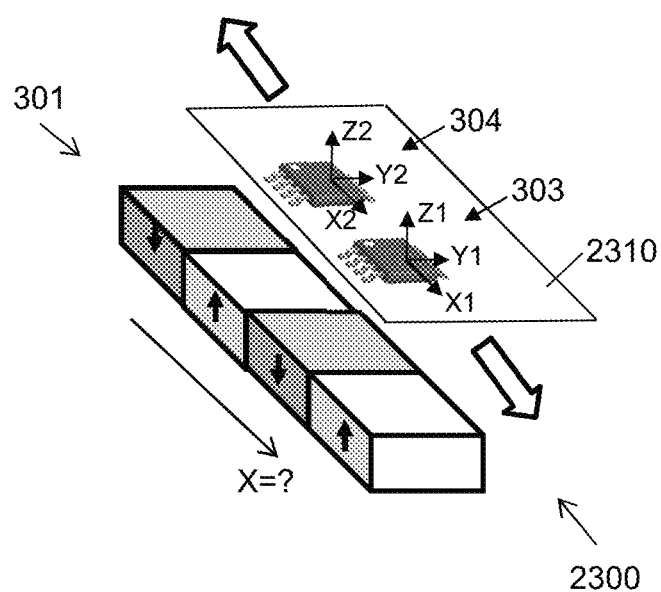
FIG. 23 shows a linear position sensor system 2300 according to an embodiment of the present invention, which can be seen as a variant of the system shown in FIGS. 19(a) and 19(b) or FIG. 22.

While the invention has been described mainly for angular position sensors, the invention also works for linear position sensors, for example as illustrated in FIG. 22 and FIG. 23.

FIG. 22 shows a linear position sensor system 2200 which can be seen as a variant of the angular position sensor system 2000 of FIGS. 20(a) and 20(b), or as a variant of the system 2100 shown in FIG. 21. The same formulas are applicable, but the "angular value" calculated would have to be converted to a linear distance value, e.g. using a predefined constant. The same or similar comments as mentioned above for FIGS. 19(a) and 19(b) to FIG. 21 are also applicable here, mutatis mutandis.

In the example of FIG. 22, the magnetic structure is magnetized in a direction parallel to the plane o the sensor device, namely in the Y-direction. The sensor devices may measure a Bx and a By component at a first and a second location. That means, the sensor device may measure two in-plane field components, parallel to the substrate of the sensor devices.

FIG. 23 shows a linear position sensor system 2300 which can be seen as a variant of the angular sensor system 1900 of FIGS. 19(a) and 19(b), or as a variant of the sensor system 2200 of FIG. 22.

In the example of FIG. 23, the magnetic structure is magnetized in a direction perpendicular to the plane o the sensor device, namely in the Z-direction. The sensor devices may measure a Bx and a Bz magnetic field component at a first and a second location. That means, the sensor device may measure an in-plane field component parallel to the substrate and an out-of-plane magnetic field component perpendicular to the substrate.

While not worked out in detail, it can be understood from the examples of FIG. 22 and FIG. 23 versus FIGS. 19(a) and 19(b) to FIG. 21, that the formulas of angular position sensors described above where the sensor devices are mounted off-axis (i.e. not on the rotation axis), in particular the embodiments of FIG. 12 to FIG. 18, can also be extended to linear position sensors.

While individual features are explained in different drawings and different embodiments of the present invention, it is contemplated that features of different embodiments can be combined, as would be obvious to the skilled person, when reading this document.

The invention claimed is:

1. A position sensor system comprising:
   a magnetic field generator movable relative to a first and a second sensor device or vice versa, and being adapted for providing a first magnetic field vector to the first magnetic sensor device and for providing a second magnetic field vector different from the first magnetic field vector, to the second magnetic sensor device;
   the first magnetic sensor device being adapted for determining first vector data related to a combination of said first magnetic field vector and an external disturbance field, when present;
   the second magnetic sensor device being adapted for determining second vector data related to a combination of said second magnetic field vector and said external disturbance field, when present;
   the position sensor system further comprising at least one processor adapted for receiving the first vector data and the second vector data, and adapted determining a position of the magnetic field generator relative to the first and the second magnetic sensor device, based on the first vector data and the second vector data in a manner which eliminates the external disturbance field;

wherein
the first magnetic sensor device is configured for measuring, at a first sensor position, a first magnetic field component oriented in a first direction and a second magnetic field component oriented in a second direction; and the second magnetic sensor device is configured for measuring, at a second sensor position, a third magnetic field component oriented in said first direction and a fourth magnetic field component oriented in said second direction; and the magnetic field generator is magnetized such that, and the first magnetic sensor device is oriented relative to the magnetic field generator such that the first magnetic field component is substantially 90° phase shifted relative to the second magnetic field component, and the magnetic field generator is magnetized such that, and the second magnetic sensor device is oriented relative to the magnetic field generator such that the third magnetic field component is substantially 90° phase shifted relative to the fourth magnetic field component; and the first and the second magnetic sensor device are spaced apart such that the first magnetic field component is phase shifted relative to the third magnetic field component by a value in a range from 30° to 330°.

2. The position sensor system of claim 1,
wherein the first and the second magnetic sensor device are spaced apart such that the first magnetic field component is phase shifted relative to the third magnetic field component by substantially 180°.

3. The position sensor system of claim 1,
wherein the position sensor system is a linear position sensor system; and
wherein the position is a linear position; and
wherein the magnetic field generator is movable along a longitudinal axis, or wherein the first and the second sensor are movable along a longitudinal axis; and
wherein the first and the second magnetic sensor device have a predefined first and second position and a predefined first and second orientation relative to said longitudinal axis.

4. The position sensor system of claim 1,
wherein the position sensor system is an angular position sensor system; and
wherein the position is an angular position; and
wherein the magnetic field generator is rotatable about a longitudinal axis; and
wherein the first and the second magnetic sensor device have a predefined first and second position and a predefined first and second orientation relative to said longitudinal axis.

5. The position sensor system of claim 1,
wherein the first magnetic sensor device comprises a first substrate defining a first plane;
and wherein the second magnetic sensor device comprises a second substrate defining a second plane;
and wherein the first plane and the second plane are substantially parallel.

6. The position sensor system of claim 5,
wherein the first direction is parallel to the first substrate and the second direction is perpendicular to the first substrate and the third direction is parallel to the second substrate and the fourth direction is perpendicular to the second substrate;
or wherein the first direction is parallel to the first substrate and the second direction is parallel to the first substrate and the third direction is parallel to the second substrate and the fourth direction is parallel to the second substrate.

7. The position sensor system of claim 1,
wherein said determining a position of the magnetic field generator relative to the first and second sensor comprises calculating the position based on the following set of formulas:

$$\begin{cases} B1magx = (v1x - v2x)/2; \\ B1magz = (v1z - v2z)/2; \\ \alpha = \arctan(B1magz/B1magx); \end{cases}$$

wherein $\alpha$ is an angular position of the first or the second sensor device relative to the magnetic field generator, (v1x, v1z) are vector coordinates of the first magnetic field vector measured by the first magnetic sensor device, (v2x, v2z) are vector coordinates of the second magnetic field vector measured by the second magnetic sensor device, and (B1magx, B1magz) are vector-coordinates of a magnetic field created solely by the magnetic field generator.

8. The position sensor system of claim 1,
wherein the first magnetic sensor device comprises one Horizontal Hall element for measuring the second magnetic field component and one vertical Hall element for measuring the first magnetic field component; and
wherein the second magnetic sensor device comprises one Horizontal Hall element for measuring the fourth magnetic field component and one vertical Hall element for measuring the third magnetic field component.

9. The position sensor system of claim 1,
wherein the first magnetic sensor device comprises a first and a second horizontal Hall element arranged on opposite sides of a first circular integrated magnetic concentrator;
wherein the second magnetic sensor device comprises a third and a fourth horizontal Hall element arranged on opposite sides of a second circular integrated magnetic concentrator;
wherein the second magnetic concentrator is spaced from the first magnetic concentrator;
wherein the first magnetic field component is determined by calculating a difference of signals obtained from the first and the second Hall element;
wherein the second magnetic field component is determined by calculating a sum of signals obtained from the first and the second Hall element;
wherein the third magnetic field component is determined by calculating a difference of signals obtained from the third and the fourth Hall element;
wherein the fourth magnetic field component is determined by calculating a sum of signals obtained from the third and the fourth Hall element.

\* \* \* \* \*